US 11,880,784 B2

United States Patent
Bowman et al.

(10) Patent No.: US 11,880,784 B2
(45) Date of Patent: Jan. 23, 2024

(54) SYSTEM AND MOBILE FREIGHT STATION AND METHOD FOR DISTRIBUTION, DELIVERY, AND COLLECTION OF FREIGHT

(71) Applicant: STARSHIP TECHNOLOGIES OÜ, Tallinn (EE)

(72) Inventors: Daniel Bowman, Stuttgart (DE); Steven Kasih, Stuttgart (DE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 991 days.

(21) Appl. No.: 16/266,108

(22) Filed: Feb. 3, 2019

(65) Prior Publication Data

US 2019/0236741 A1    Aug. 1, 2019

Related U.S. Application Data

(63) Continuation of application No. PCT/EP2017/069727, filed on Aug. 3, 2017, which is
(Continued)

(30) Foreign Application Priority Data

Aug. 5, 2016 (DE) .......... 102016009563.6
Aug. 5, 2016 (DE) .......... 102016009572.5
Aug. 5, 2016 (DE) .......... 102016009573.3

(51) Int. Cl.
*G06Q 50/28* (2012.01)
*B60L 53/00* (2019.01)
(Continued)

(52) U.S. Cl.
CPC .............. *G06Q 50/28* (2013.01); *B60L 53/00* (2019.02); *B60L 53/36* (2019.02); *B60L 53/80* (2019.02);
(Continued)

(58) Field of Classification Search
CPC ......... G06Q 50/28; B60L 53/36; B60L 53/80; B60L 53/00; B60L 2200/40;
(Continued)

(56) References Cited

U.S. PATENT DOCUMENTS

| 4,549,841 A | 10/1985 | Ishige |
| 5,664,928 A | 9/1997 | Stauber |

(Continued)

FOREIGN PATENT DOCUMENTS

| DE | 10 2016 007 467 | 6/2016 |
| DE | 102016009563.6 | 8/2016 |

(Continued)

OTHER PUBLICATIONS

WIPO/EPO, International Preliminary Report on Patentability Chapter I, PCT/EP2017/069727, dated Feb. 5, 2019 (7p.).
(Continued)

*Primary Examiner* — Frederick M Brushaber
(74) *Attorney, Agent, or Firm* — Siritzky Law, PLLC

(57) ABSTRACT

The invention concerns a system for distributing, delivering and collecting freight, with a number I of mobile freight stations, with $I \geq 1$, each having a first interface for automatically loading freight into freight vehicles from a freight storage of the mobile freight station and for automatically unloading freight from freight vehicles into the freight storage, wherein the freight vehicles are arranged and executed for automatically loading/unloading freight via the first interface and for automatically securing/fixing freight in a storage space of the freight vehicles, the mobile freight stations each have a number $ni \leq Ni$, with $i=1, \ldots, I$, of delivery robots, where Ni is the maximum number of delivery robots present in the ith freight station and ni is the number of delivery robots currently present in the ith freight station, and the I freight stations each have a loading device
(Continued)

for automatically loading the Ni delivery robots with a respective freight from the freight storage and for automatically unloading a respective freight from the Ni delivery robots into the freight storage.

22 Claims, 7 Drawing Sheets

Related U.S. Application Data a continuation of application No. PCT/EP2017/069723, filed on Aug. 3, 2017, which is a continuation of application No. PCT/EP2017/069729, filed on Aug. 3, 2017.

(51) Int. Cl.
  *B60L 53/36* (2019.01)
  *B60L 53/80* (2019.01)
  *G05D 1/02* (2020.01)
  *H04L 67/12* (2022.01)

(52) U.S. Cl.
  CPC ........ *G05D 1/0287* (2013.01); *B60L 2200/40* (2013.01); *H04L 67/12* (2013.01)

(58) Field of Classification Search
  CPC ....... G05D 1/0287; H04L 67/12; Y02T 90/12; Y02T 10/7072; Y02T 90/14; Y02T 10/70
  See application file for complete search history.

(56) References Cited

U.S. PATENT DOCUMENTS

| | | | |
|---|---|---|---|
| 5,942,869 A | 8/1999 | Katou et al. | |
| 6,457,921 B1 * | 10/2002 | Freeman | B60P 7/065 410/125 |
| 6,467,293 B1 | 10/2002 | Goosman | |
| 6,602,037 B2 | 8/2003 | Winkler | |
| 7,073,634 B2 | 7/2006 | Mitchell et al. | |
| 7,320,289 B1 | 1/2008 | Clarke et al. | |
| 7,894,939 B2 | 2/2011 | Zini et al. | |
| 7,931,431 B2 | 4/2011 | Benedict et al. | |
| 8,010,230 B2 | 8/2011 | Zini et al. | |
| 8,104,601 B2 | 1/2012 | Hayduchok et al. | |
| 8,204,624 B2 | 6/2012 | Zini et al. | |
| 8,267,307 B1 | 9/2012 | Leon et al. | |
| 8,485,285 B2 | 7/2013 | Ferrigni | |
| 8,874,360 B2 | 10/2014 | Klinger et al. | |
| 8,948,914 B2 | 2/2015 | Zini et al. | |
| 9,020,632 B2 | 4/2015 | Naylor | |
| 9,031,692 B2 | 5/2015 | Zhu | |
| 9,073,637 B2 | 7/2015 | Ohtomo et al. | |
| 9,230,236 B2 * | 1/2016 | Villamar | G06Q 10/087 |
| 9,244,147 B1 | 1/2016 | Soundararajan et al. | |
| 9,256,852 B1 | 2/2016 | Myllymaki | |
| 9,266,675 B2 | 2/2016 | Yamashita | |
| 9,305,280 B1 * | 4/2016 | Berg | B64D 5/00 |
| 9,373,149 B2 | 6/2016 | Abhyanker | |
| 9,557,740 B2 | 1/2017 | Crawley | |
| 9,561,941 B1 | 2/2017 | Watts | |
| 9,694,976 B1 | 7/2017 | Wurman et al. | |
| 9,778,653 B1 * | 10/2017 | McClintock | B67D 7/348 |
| 9,844,879 B1 | 12/2017 | Cousins et al. | |
| 9,868,526 B2 | 1/2018 | Yates | |
| 9,915,956 B2 * | 3/2018 | Bokeno | B64F 1/362 |
| 9,984,347 B2 | 5/2018 | Dreano, Jr. | |
| 10,216,188 B2 * | 2/2019 | Brady | G05D 1/0276 |
| 10,308,430 B1 * | 6/2019 | Brady | G05D 1/0278 |
| 10,310,499 B1 * | 6/2019 | Brady | G05D 1/0278 |
| 10,310,500 B1 * | 6/2019 | Brady | G05D 1/0291 |
| 10,514,690 B1 * | 12/2019 | Siegel | G05D 1/102 |
| 2003/0165373 A1 | 9/2003 | Felder et al. | |
| 2005/0207876 A1 | 9/2005 | Springwater | |
| 2006/0237239 A1 | 10/2006 | Bruner et al. | |
| 2011/0079166 A1 * | 4/2011 | Popa-Simil | B60L 50/60 180/2.2 |
| 2012/0090110 A1 | 4/2012 | Van Den Berg et al. | |
| 2013/0110281 A1 | 5/2013 | Jones et al. | |
| 2013/0332021 A1 | 12/2013 | Goren | |
| 2014/0081445 A1 | 3/2014 | Villamar | |
| 2014/0136414 A1 | 5/2014 | Abhyanker | |
| 2014/0180914 A1 * | 6/2014 | Abhyanker | G05D 1/102 705/332 |
| 2014/0254896 A1 | 9/2014 | Zhou et al. | |
| 2014/0365258 A1 | 12/2014 | Vestal et al. | |
| 2014/0371952 A1 | 12/2014 | Ohtomo et al. | |
| 2015/0006005 A1 * | 1/2015 | Yu | G06Q 50/28 701/22 |
| 2015/0045945 A1 | 2/2015 | Zini et al. | |
| 2015/0100152 A1 | 4/2015 | Barragan Trevino et al. | |
| 2015/0183581 A1 | 7/2015 | Worsley | |
| 2015/0379468 A1 | 12/2015 | Harvey | |
| 2016/0107750 A1 | 4/2016 | Yates | |
| 2016/0185466 A1 | 6/2016 | Dreano, Jr. | |
| 2016/0200438 A1 * | 7/2016 | Bokeno | B64F 1/362 244/2 |
| 2016/0207710 A1 | 7/2016 | Conrad et al. | |
| 2016/0214717 A1 * | 7/2016 | De Silva | B64D 5/00 |
| 2016/0221768 A1 * | 8/2016 | Kadaba | B60P 1/5438 |
| 2016/0224930 A1 * | 8/2016 | Kadaba | B65G 1/16 |
| 2016/0257401 A1 * | 9/2016 | Buchmueller | G06Q 10/047 |
| 2016/0325928 A1 | 11/2016 | Lepek et al. | |
| 2016/0355337 A1 | 12/2016 | Lert et al. | |
| 2016/0368464 A1 | 12/2016 | Hassounah | |
| 2017/0017237 A1 | 1/2017 | Tokuyama et al. | |
| 2017/0100837 A1 | 4/2017 | Zevenbergen et al. | |
| 2017/0185853 A1 | 6/2017 | Yokota et al. | |
| 2017/0220981 A1 | 8/2017 | Shucker et al. | |
| 2017/0267452 A1 | 9/2017 | Goren et al. | |
| 2018/0020896 A1 | 1/2018 | High et al. | |
| 2018/0349834 A1 | 12/2018 | Heinla et al. | |

FOREIGN PATENT DOCUMENTS

| | | |
|---|---|---|
| DE | 102016009572.5 | 8/2016 |
| DE | 102016009573.3 | 8/2016 |
| DE | 10 2015 209 127 | 11/2016 |
| EP | 2818958 | 12/2014 |
| GB | 1902781.2 | 3/2019 |
| GB | 1902799.4 | 3/2019 |
| GB | 1902801.8 | 3/2019 |
| WO | WO2002042117 | 5/2002 |
| WO | PCT/EP2017/069723 | 8/2017 |
| WO | PCT/EP2017/069727 | 8/2017 |
| WO | PCT/EP2017/069729 | 8/2017 |

OTHER PUBLICATIONS

WIPO/EPO, English Translation of the Written Opinion of the International Searching Authority, PCT/EP2017/069727, dated Dec. 5, 2018 (5p.).
WIPO/EPO, Written Opinion of the International Searching Authority, PCT/EP2017/069727, dated Feb. 8, 2018 (6p.).
WIPO/EPO, English Translation of the Isr, PCT/EP2017/069727, dated Feb. 8, 2018 (3p.).
WIPO/EPO, International Search Report, PCT/EP2017/069727, dated Feb. 8, 2018 (4p.).
WIPO/EPO, International Preliminary Report on Patentability Chapter I, PCT/EP2017/069729, dated Feb. 5, 2019 (7p.).
WIPO/EPO, English Translation of the Written Opinion of the International Searching Authority, PCT/EP2017/069729, dated Dec. 5, 2018 (5p.).
WIPO/EPO, Written Opinion of the International Searching Authority, PCT/EP2017/069729, dated Feb. 8, 2018 (6p.).
WIPO/EPO, English Translation of the International Search Report, PCT/EP2017/069729, dated Feb. 8, 2018 (3p.).
WIPO/EPO, International Search Report, PCT/EP2017/069729, dated Feb. 8, 2018 (4p.).

(56) References Cited

OTHER PUBLICATIONS

WIPO/EPO, International Preliminary Report on Patentability Chapter I, PCT/EP2017/069723, dated Feb. 5, 2019 (7p.).
WIPO/EPO, English Translation of the Written Opinion of the International Searching Authority, PCT/EP2017/069723, dated Nov. 30, 2018 (5p.).
WIPO/EPO, International Search Report, PCT/EP2017/069723, dated Feb. 8, 2018 (4p.).
WIPO/EPO, English Translation of the International Search Report, PCT/EP2017/069723, dated Feb. 8, 2018 (3p.).
WIPO/EPO, Written Opinion of the International Searching Authority, PCT/EP2017/069723, dated Feb. 8, 2018 (6p.).
WIPO/EPO, English Translation of International Preliminary Report on Patentability Chapter I, PCT/EP2017/069723, dated Feb. 5, 2019 (6p.).
UK Intellectual Property Office, Examination Report Report in UK Application No. GB1902781.2, dated Sep. 20, 2021 (6 pgs.).
UK Intellectual Property Office, Examination Report Report in UK Application No. GB1902799.4, dated Sep. 23, 2021 (4 pgs.).
UK Intellectual Property Office, Examination Report Report in UK Application No. GB1902801.8, dated Sep. 23, 2021 (4 pgs.).
Kaltenbrunner, English abstract of DE 10 2015 209 127, Nov. 24, 2016.
Maihoefer, English abstract of DE 10 2016 007 467, Jun. 18, 2016.
Baker: "Automated Street Crossing for Assistive Robots" Proceedings of the 2005 IEEE, Jun. 28-Jul. 1, 2005.
Search Report (Recherchebericht) for DE 1705090088, dated May 9, 2017 [8 pgs.]
Search Report (Recherchebericht) for DE 1705040164, dated May 9, 2017 [8 pgs.]
Search Report (Recherchebericht) for DE 1705150022, dated May 12, 2017 [8 pgs.]
Anonymous: "Lieferroboter Starship: "Klauen würde ich ihn nicht"—Auto-Tagesspiegel" ("I wouldn't steal him") Nov. 29, 2015, Retrieved from the Internet: URL: http://www.tagesspiegel.de/mobil/lieferroboter-starship-klauen-wuerde-ich-ihn-nicht/12647114.html, English translation.
Pettitt, Jeniece: "Forget delivery drones, meet your new delivery robot", Nov. 2, 2015, Retrieved from the Internet: URL: https://www.cnbc.com/2015/11/02/forget-delivery-drones-meet-your-new-delivery-robot.html.

\* cited by examiner

SYSTEM AND MOBILE FREIGHT STATION AND METHOD FOR DISTRIBUTION, DELIVERY, AND COLLECTION OF FREIGHT

RELATED APPLICATIONS

This application is a continuation of: (i) PCT/EP2017/069723, (ii) PCT/EP2017/069727, and (iii) PCT/EP2017/069729, each of which designated the United States, and each of which was filed Aug. 3, 2017, and the entire contents of each of which are hereby fully incorporated herein by reference for all purposes.

PCT/EP2017/069723 claims priority to DE 102016009563.6, filed Aug. 5, 2016. PCT/EP2017/069727 claims priority to DE 102016009572.5, filed Aug. 5, 2016. PCT/EP2017/069729 claims priority to DE 102016009573.3, filed Aug. 5, 2016.

This application also claims priority to (i) DE 102016009563.6, (ii) DE 102016009572.5; and (iii) DE 102016009573.3, the entire contents of each of which are hereby fully incorporated herein by reference for all purposes.

FIELD OF THE INVENTION

The invention concerns a system and a mobile freight station and method for the distribution, delivery and collection of freight. The term "freight" is to be understood broadly in this context. It basically comprises all transportable objects, preferably objects that are typically transported as individual objects as part of the postal, parcel, transport or forwarding service, such as particular parcels, post, general cargo, and so on. The invention is used in particular in mail, transport and forwarding business.

The purpose of the invention is to provide a system for the distribution, delivery and collection of freight that is more flexible and reliable than today's systems.

The invention results from the characteristics of the independent claims. Advantageous developments and embodiments are the subject of the dependent claims.

A first embodiment of the invention is a system for distributing, delivering and collecting freight, comprising a number I of mobile freight stations, with $I \geq 1$, each freight station having a first interface for automatically loading freight from a freight storage of the mobile freight station into freight vehicles and for automatically unloading freight from freight vehicles into the freight storage, wherein the freight vehicles are adapted and configured for automatically loading/unloading freight via the first interface and for automatically securing/fixing freight in a storage space of the freight vehicles; the mobile freight stations each having a number $n_i \leq N_i$, where $i=1, \ldots, I$, of delivery robots, wherein $N_i$ is the maximum number of delivery robots present in the i-th freight station and $n_i$ is the number of delivery robots currently present in the i-th freight station, wherein the I freight stations each have a loading device for automatically loading each of the $N_i$ delivery robots with a respective freight from the freight storage and for automatically unloading a respective freight from each of the $N_i$ delivery robots into the freight storage.

Advantageously, the I freight stations have each a first communication interface for communicating with the $n_i$ delivery robots and a second communication interface for communicating with the freight vehicles. Advantageously, the I freight stations each have a number $N_i$ of charging interfaces for individual charging of energy storage devices of $N_i$ delivery robots. Advantageously, the I freight stations each have a control unit to control the first interface, the loading device and the $n_i$ delivery robots.

To accommodate the delivery robots, the mobile freight stations (preferably inside the freight stations) have an appropriate parking area for delivery robots. According to another advantageous embodiment, the mobile freight stations each have a device that allows automatic loading and/or unloading of the delivery robots into/from the parking area to/from an environment of the freight station. Depending on the type of delivery robots and mobile freight stations, this device may be, for example, a controllable ramp and/or a controllable lifting system and/or a take-off and landing platform and/or a docking and departing interface. According to another advantageous embodiment, said device for automatic loading and unloading of delivery robots into/from the respective mobile freight station is automated or autonomously controlled by a control system. For example, the folding out or in of a ramp is controlled by the control system.

According to another advantageous embodiment, the mobile freight stations have a warning device with which an acoustic and/or visual warning signal for an environment can be emitted before and/or during a loading and/or unloading process of delivery robots in/from the parking area. For this purpose, the respective mobile freight stations advantageously comprise at least one electro-acoustic transducer (loudspeaker, signal horn, etc.) and/or one or more light sources, an optical display panel, etc.

The mobile freight stations are preferably vehicles, e.g. trucks, small vans, vans, delivery vans or buses. The mobile freight stations are preferably adapted and configured for autonomous driving, i.e. they are self-driving and thus allow an autonomous transfer from one place to another without requiring the intervention of an operator for this. Of course, mobile freight stations, which must be controlled by a driver in order to change their position, are included in the invention. The mobile freight stations are advantageously equipped with a power unit, for example a combustion power unit or an electric power unit. The positioning of the freight stations is preferably controlled or monitored by a control center. Preferably, the positioning of freight stations depends on the addresses of senders/receivers of current freight deliveries. Preferably, the mobile freight stations are positioned in a way so that as many of the sender/receiver addresses as possible are located in the proximity of a freight station, so that different delivery robots can preferably move from the respective freight station to different delivery or sender addresses at the same time.

The term "delivery robot" is interpreted in the present case in particular as a self-driving delivery robot, a self-flying delivery robot (drone) or a self-controlling floating vehicle etc. The delivery robot is adapted and configured for the autonomous receiving, fixing and hand-over of freight. Furthermore, the delivery robot preferably comprises an input interface by which a recipient or sender of a freight can enter information about the freight. Preferably, this information are transmitted to the freight vehicle and from there preferably to a control center. Furthermore, the delivery robot preferably comprises an output interface via which information can be transmitted to a recipient or sender of a freight.

The delivery robots are advantageously adapted and configured so that they are steered and driven automatically, advantageously completely autonomously, i.e. without direct control and intervention by a human operator. The delivery robots are therefore equipped in particular with a positioning and navigation system, as well as with a robot guidance computer, which performs the autonomous control of the robot. The delivery robots can thus move autonomously from one position to another (e.g. the address of a parcel recipient) and return again. The robot guidance computer is provided with an up-to-date (2D-/3D-) routing based on which the navigation and control of the delivery robot is performed. Advantageously, the delivery robots are equipped with a sensor system for recording the current environment, as well as an analyzing unit for analyzing the recorded environmental data with regard to present obstacles. Advantageously, the data is also used to control the delivery robot.

The "freight vehicles" are preferably trucks, small vans, vans, delivery vans or buses. The freight vehicles can also be passenger cars, rail vehicles, water vehicles (e.g. ships), underwater vehicles or aircraft. Preferably, the freight vehicles are driven autonomously at the location of the mobile freight stations or in a nearby environment (e.g. within a radius of 5-50 m) in such a way that they dock mechanically to the first interface for automatic loading or unloading of freight via the first interface. Preferably, the freight vehicles comprise an automated loading and unloading system that provides the first interface with cargo in the freight vehicle.

Advantageously, the freight vehicles are configured and adapted in such a way that freight items are transported on freight pallets or as package units, wherein advantageously, several freight items/package units are arranged on one freight pallet. When loading or unloading freight via the first interface, freight pallets with/without freight are advantageously exchanged. Preferably, the loading or unloading of the vehicle with freight or freight pallets is performed fully automatically, under the condition that the freight vehicle has docked with the first interface.

Advantageously, each transported package comprises a data storage that can be read by the control unit. This data storage can advantageously store one or more of the following information: Address of a receiver/sender, identification of one of the $I^{th}$ freight stations as destination station, identification of several freight stations on the way to the destination station. These or other information are substantially used to operationally steer or control the delivery or collection of a package.

According to the invention, the freight stations each have a loading device for automatically loading each of the $N_i$ delivery robots with one freight from the freight storage and for automatically unloading one freight from each of the $N_i$ delivery robots into the freight storage. That is, packages that have been delivered by a freight vehicle and that were automatically loaded to the freight storage of a mobile freight station via the first interface are automatically assigned to one of the $n_i$ delivery robots and loaded into it. Reciprocally, packages that have for example been picked up by a delivery robot from a sender and that have arrived at the freight stations after the autonomous return of the delivery robot, are automatically unloaded from these delivery robots and automatically transferred to the freight storage of the freight stations.

Advantageously, the loading device comprises a storage and retrieval machine with which freight is automatically picked from a rack system in the freight storage for a respective delivery robot and/or freight is automatically unloaded from a delivery robot into the rack system.

Advantageously, the loading device, in particular the storage and retrieval machine, is configured to respectively supply freight or pick up freight and sort it into the rack system for loading and unloading a freight vehicle via the first interface.

Advantageously, the freight stations are adapted and configured so that they can perform the tasks automatically and autonomously, i.e. without involvement of an operator.

The aforementioned $N_i$ charging interfaces of the freight stations allow an individual automatic charging of energy storage devices of the delivery robots in the freight station in order to supply the delivery robots with new energy or to recharge them. The energy transferred to the delivery robots via the charging interfaces can be transferred in particular in the form of electrical energy and/or fuels (petrol, diesel, liquid hydrogen, liquid gas, etc.). The energy storage devices of the delivery robots are respective accumulators or containers to hold liquid or gaseous fuels.

According to an advantageous embodiment, the charging interfaces transfer energy to the delivery robots by an inductive principle. I.e. a constantly changing electromagnetic field is generated by an electrical energy source, which produces an induction current in the receiver that is used to charge in particular an accumulator of a delivery robot. Advantageously, a contactless charging of an accumulator can thus be implemented. Advantageously, the loading interfaces are adapted and configured so that as soon as a delivery robot has reached a designated position in the mobile freight station and, for example, an approval to start autonomous loading was given, the loading process begins and, if necessary, a mechanical contact between the mobile freight stations and delivery robots is automatically established via the loading interface.

According to an advantageous embodiment, the charging interfaces each comprise a mechanical interface for transmitting electrical energy to a delivery robot, which can autonomously establish an electrical contact between the delivery robot and one of the charging interfaces. Advantageously, the loading process of the delivery robots can be performed without the intervention of an operator, i.e. autonomously.

Advantageously, the delivery robots are adapted and configured to autonomously transport freight to a specified address in an environment of the respective freight station i, to deliver a respective freight there and/or to receive a freight there and to autonomously return to the freight station i. The delivery robots are also configured to autonomously transport freight to a specified address in an environment of the respective freight station i, to deliver the respective freight there and/or to receive a freight there and to autonomously return to the freight station i. If the freight cannot be delivered to the respective address, the delivery robot returns preferably with the freight to the freight station i.

According to an advantageous embodiment, one or more of the mobile freight stations each have a space optimization system with optical sensors for determining the present delivery robots, wherein the space optimization system controls a positioning of the delivery robots in the mobile freight stations via the first communication interface. The space optimization system comprises an image analysis processor to determine the current positioning of the delivery robots and a control unit that communicates with and controls the delivery robots in the mobile freight station via the first communication interface. Advantageously, information on the amount and position of the delivery robots in a mobile freight station are available to said mobile freight station, this makes in particular a parking area for delivery robots in the mobile freight station controllable, verifiable and optimizable.

According to another advantageous embodiment, the mobile freight stations comprise a device for detecting and providing at least one of the following states of the respective mobile freight station:
- Loading of the freight station with delivery robots (this refers to the loading process),
- Unloading the freight station from delivery robots (this refers to the unloading process),
- Number n of delivery robots already loaded in the freight station,
- Number F=N−n of free places for delivery robots in the freight station,
- Failure indication of the freight station.

This information is used to detect an operational state of the respective freight station, for example to communicate it to a driver of a freight vehicle and/or to forward it to a control center. Furthermore, this information can be used in the freight vehicle or in the control center to identify operational delays of the freight vehicle compared to a previously provided delivery schedule and to consider those delays for planning or to take appropriate measures in case of transmitted error messages from a freight station.

According to an advantageous embodiment, the storage space of the freight vehicle has different levels for receiving the delivery robots. This allows an optimized use of the storage space. According to another advantageous embodiment, the storage space of the freight vehicle is configured to receive pallets that are already loaded with delivery robots. The pallets are advantageously configured so that they fit into an insertion slide-in system in the storage space. Advantageously, the pallets have a size that corresponds approximately to the floor zone of the storage space, so that the number of inserted pallets equals the number of levels loaded with delivery robots in the storage space.

Preferably, the first and/or the second communication interface use a Bluetooth, WiFi, GSM, UMTS or LTE connection.

Another aspect of the invention concerns a mobile freight station for the distribution, delivery and collection of freight, for a system as described above, comprising:
- a first interface for automatic loading of freight into freight vehicles from a freight storage of the mobile freight station and for automatic unloading of freight from freight vehicles into the freight storage; wherein the freight vehicles are adapted and configured for automatically loading/unloading freight via the first interface and for automatically securing/fixing freight in a storage space of the freight vehicles,
- a number n≤N of delivery robots, wherein N is the maximum number of delivery robots present in the freight station and n is the number of delivery robots currently present in the freight station,
- a loading device for automatically loading the N delivery robots each with a freight from the freight storage and for automatically unloading a freight from each of the N delivery robots into the freight storage,
- a first communication interface to communicate with the n delivery robots,
- a second communication interface for communicating with the freight vehicles,
- a number N of charging interfaces for individually charging energy storage devices of N delivery robots, and
- a control unit for controlling the first interface, the loading device and the n delivery robots.

Further numbered embodiments form part of the invention.

Below is a list of further embodiments. Those will be indicated with a letter "B". Whenever such embodiments are referred to, this will be done by referring to "B" embodiments. FIGS. 2a-4 and the corresponding description illustrate exemplary "B" embodiments. Also, further description relating to the "B" embodiments follows directly below them.

B1. A vehicle (201) for receiving a number n≤N of delivery robots (250) into a loading space (210) of the vehicle (201), wherein N is the number of maximum receivable delivery robots (250) in the loading space (210) and n is the number of delivery robots (250) currently located in the loading space (210):
- a fixing device (212) for automatically individually fixing N delivery robots (250) in the loading space (210),
- a communication interface (214) for said vehicle (201) to communicate with said n delivery robots (250), and
- a number N of charging interfaces (216) for the individual automatic charging of energy stores of the n delivery robots (250) in the loading space (210).

B2. The vehicle (201) according to embodiment B1, wherein the communication interface (214) communicates at least one of the following states of a respective one of the n delivery robots (250) to the vehicle (201):
- Loading condition of the respective delivery robot (250),
- Type of loading of the respective delivery robot (250),
- Position of the respective delivery robot (250),
- Delivery address reached,
- Available operating energy of the respective delivery robot (250),
- Error messages.

B3. The vehicle (201) according to any of embodiments B1 to B2, wherein the communication interface (214) communicates at least one of the following information from the vehicle (201) to one or more or all of the n delivery robots (250):
- Start signal for autonomous unloading of the respective delivery robot (250),
- Delivery address to be driven to by the respective delivery robot (250),
- Type of transfer,
- Parking position in vehicle (201) reached,
- Start charging with electrical energy.

B4. The vehicle (201) according to any of embodiments B1 to B3, comprising a device (220) for detecting and providing at least one of the following states in the vehicle (201):
- Loading the vehicle (201) with delivery robots (250),
- Unloading the delivery robots (250) from the vehicle (201),
- Number n of delivery robots already loaded (250) in the vehicle (201),
- Number F=N−n of the free receiving places for delivery robots (250) in the vehicle (201),
- Information on a route to be taken by the vehicle (201),
- Information about a target position to be driven to by the vehicle (201),
- Error messages.

B5. The vehicle (201) according to any of embodiments B1 to B4, wherein the fixing device (212) comprises one or more inflatable units for fixing the delivery robots (250).

B6. The vehicle (201) according to any of embodiments B1 to B5, wherein the loading space (210) of the vehicle (201) comprises different levels for receiving the delivery robots (250).

B7. The vehicle (201) according to any of embodiments B1 to B6, comprising a device (222) for automatically loading and/or unloading the delivery robots (250) into/from the loading space (210).

B8. The vehicle (201) according to any of embodiments B1 to B7, comprising a warning device with which an acoustic and/or optical warning signal for an environment of the vehicle (201) can be output before the start and/or during a loading and/or unloading process of the loading space (210).

B9. A method for delivering parcels with a vehicle (201), in particular according to one of embodiments B1 to B8, to a plurality of locally distributed recipients in an environment of a location O2, wherein the delivery robots (250) are each adapted to receive a freight and autonomously transport it from the location O2 to a predetermined delivery address, deliver the freight and autonomously return to the location O2 to autonomously enter the hold (210) of the vehicle (201), comprising the following steps:
Loading (S1) a number of m delivery robots (250) with one freight each,
Providing (S2) the vehicle (201) and the delivery robot (250) loaded with the freight at a location O1,
Automated loading (S3) of the loading space of the vehicle (201) with the m delivery robots (250) loaded with freight at location O1,
Driving (S4) the vehicle (201) from location O1 to a location O2,
Automated unloading (S5) of at least one of the delivery robots (250), each loaded with a freight, at location O2, wherein this delivery robot (250) then autonomously transports the freight from location O2 to a predetermined delivery address, delivers the freight and autonomously returns to location O2,
Autonomous loading (S6) of this delivery robot (250) into the loading space (210) of the vehicle (201).

B10. A method for picking up a number n≤N of delivery robots (250) in a loading space (210) of a vehicle (201), in particular according to one of the embodiments B1 to B8, wherein N is the number of maximum delivery robots (250) which can be picked up in the loading space (210) and n is the number of delivery robots (250) currently located in the loading space (210):
automatic individual fixing of N delivery robots (250) in the hold (210) by means of a fixing device (212),
communicating of vehicle (201) with said n delivery robots (250) through a communication interface (214); and
individual automatic charging of energy stores of the n delivery robots (250) in the hold (210) by a number N of charging interfaces (216).

B11. The method according to embodiment B10,
wherein the communication interface (214) communicates at least one of the following states of a respective one of the n delivery robots (250) to the vehicle (201):
Loading condition of the respective delivery robot (250),
Type of loading of the respective delivery robot (250),
Position of the respective delivery robot (250),
Delivery address reached,
Available operating energy of the respective delivery robot (250),
Error messages
and/or wherein the communication interface (214) communicates at least one of the following information from the vehicle (201) to one or more or all of the n delivery robots (250):
Start signal for autonomous unloading of the respective delivery robot (250),
Delivery address to be driven to by the respective delivery robot (250),
Type of transfer,
Parking position in vehicle (201) reached,
Start charging with electrical energy.

B12. The method according to any of the embodiments B10 to B11, comprising a device (220) for detecting and providing at least one of the following states in the vehicle (201):
Loading the vehicle (201) with delivery robots (250),
Unloading the delivery robots (250) from the vehicle (201),
Number n of delivery robots already loaded (250) in the vehicle (201),
Number F=N−n of the free receiving places for delivery robots (250) in the vehicle (201),
Information on a route to be taken by the vehicle (201),
Information about a target position to be driven to by the vehicle (201),
Error messages.

B13. The method according to any one of the embodiments B10 to B12, wherein the fixing device (212) comprises one or more inflatable units which serve to fix the delivery robots (250) and/or the loading space (210) of the vehicle (201) having different levels for receiving the delivery robots (250).

B14. The method according to any of the embodiments B10 to B13, comprising a device (222) for automatically loading and/or unloading the delivery robots (250) into/from the loading space (210) and/or with a warning device with which an acoustic and/or optical warning signal for an environment of the vehicle (201) can be emitted before and/or during a loading and/or unloading process of the loading space (210).

B15. A system for delivering parcels to a plurality of locally distributed recipients comprising at least one vehicle (201) according to any one of embodiments B1 to B8, and
several delivery robots (250), each of which is configured to:
receive a freight,
automatically enter and leave the loading space (210) of the vehicle (201), and
after leaving the loading space (210) to autonomously navigate to a predetermined delivery address, deliver the freight, autonomously return to the vehicle (201) and autonomously return to the loading space (210).

Below follows a textual description of the "B" embodiments.

A first aspect of the "B" embodiments concerns a vehicle or a method of picking up a number n≤N of delivery robots in a hold of the vehicle, where N is the maximum number of delivery robots that can be picked up in the hold and n is the number of delivery robots currently in the hold. The vehicle comprises: a fixing device for automatically individually fixing N delivery robots in the hold, a communication interface for the vehicle to communicate with the n delivery robots, and a number N of loading interfaces for individually charging energy stores of the n delivery robots in the hold.

The vehicle is preferably a truck, small van, van, delivery van or bus. However, the vehicle can also be a passenger car, rail vehicle, watercraft (e.g. ship), underwater vehicle or aircraft.

The term "delivery robot" is understood in the present case to mean in particular a self-driving delivery robot, a self-flying delivery robot (drone), a self-controlling floating vehicle, etc.

The energy storage devices of the delivery robots are advantageous electrical energy storage devices, i.e. accumulators. These are charged by applying an electric current with a certain voltage, preferably by direct current. Alternatively or additionally, the delivery robots can be driven by combustion engines, so that the energy storage units are advantageous fuel tanks in this case. The following fuels can be considered: petrol, hydrogen, liquefied petroleum gas, etc.

The loading space of the vehicle can preferably be accessible from the rear of the vehicle and/or from one side of the vehicle. In particular, the load compartment of the vehicle can be located behind and separated from a driver's cab. Access to the vehicle's loading space can be controlled and automatically opened and closed.

The delivery robots are advantageously designed and set up in such a way that they are controlled and checked automatically, advantageously completely autonomously, i.e. without direct control by a human operator. The delivery robots are therefore equipped in particular with a positioning and navigation system, as well as with a robot guidance computer, which takes over the control of the robot. The delivery robots can thus move autonomously from one position to another (e.g. the address of a parcel recipient) and return again. The robot guidance computer is provided with a current (2D-/3D-) route guidance on the basis of which the delivery robot is controlled. The delivery robots are advantageously equipped with a sensor system for recording the current environment, as well as an evaluation unit for evaluating the recorded environmental data with regard to existing obstacles. The data is also used advantageously to control the delivery robot.

The vehicle is equipped, in accordance with the invention, with a fixing device to hold the delivery robots carried and picked up in the hold in a certain position, even if acceleration due to travel occurs. In accordance with an advantageous design, the vehicle's fixing device is also designed to fix delivery robots already loaded with freight. This is an advantage when it comes to fixing loaded and thus more massive delivery robots. The automatic fixation device can have a mechanical fixation, for example by engaging fixation hooks, by an automatic fixation by belts, etc.

In accordance with an advantageous design, the fixing device has one or more inflatable units which serve to fix the delivery robots. The fixing of the delivery robots is done by a mechanical clamping at the respective position in the vehicle by means of the inflated units. The inflatable units can be filled with a liquid and/or gaseous medium or the liquid or gaseous medium can be released from the units, whereby in the "inflated state" of the units, the unit is filled with the respective medium. The fixing device can comprise one or more individual, for example cushion-shaped inflatable units for each delivery robot. Alternatively, several delivery robots can be fixed in the hold, for example with an inflatable unit with an advantageous mattress shape. The inflatable units attach themselves to the respective outer contours of the delivery robots for fixing in the "inflated state", so that differently shaped delivery robots can be fixed with similar reliability. In other words, the inflatable units are not tied to a specific construction or outer contour of the delivery robot in order to fix it reliably in the loading space of the vehicle.

The inventive communication interface is used for communication between the vehicle and the delivery robots in order to transmit information between the vehicle and the delivery robots. The vehicle's communication interface makes advantageous use of a Bluetooth, WiFi, GSM, UMTS or LTE connection for this purpose.

In an advantageous design, the delivery robots communicate at least one of the following states of a respective delivery robot to the vehicle via the communication interface:

Loading condition of the respective delivery robot,
Type of freight (e.g. post/parcel/register/etc.) of the respective delivery robot,
Identification of the respective freight,
Position of the respective delivery robot,
Delivery address reached,
Available operating energy of the respective delivery robot,
Error message of the respective delivery robot.

It is advantageous to provide each freight with a unique identifier for identification purposes, for example in the form of a readable RFID chip. This means that the current location of each freight until it is delivered to a recipient can be recorded and communicated to the vehicle.

In another advantageous design, the vehicle communicates via the communication interface at least one of the following information to one or more or all of the n delivery robots:

Start signal for autonomous unloading of the respective delivery robot(s),
Delivery address to be driven to by the respective delivery robot,
Type of handover (storage of cargo with/without interaction with the recipient)
Parking position in vehicle reached,
Start of a charging process with energy.

This communication serves to provide the respective delivery robot, for example, with all the information required for delivery of the respective parcel or freight to a recipient. In addition, operational information, such as completion of an automatic unloading process of the delivery robot from the vehicle, start of an automatic loading process of the delivery robot on the vehicle, reaching a parking position of the delivery robot in the vehicle, start of an automatic charging process with energy, etc. can be provided from the vehicle to the respective delivery robot. Based on this information received from the vehicle, automatic control routines can, for example, be started in the respective delivery robot.

The vehicle also has an advantageous communication interface with a control center. Via this interface, some or all of the information available in the vehicle, for example on the condition of the vehicle, on the condition of the delivery robots, etc., can be advantageously transmitted from the vehicle to the control center. In addition, information, such as changes to the route of the vehicle, changes to freight-specific data, in particular the recipient data of a freight, etc., can be transmitted from the control center to the vehicle.

The above-mentioned N charging interfaces of the vehicle enable an individual automatic charging of energy storage devices of the delivery robots in the loading space of the vehicle in order to supply the delivery robots with new energy or to recharge them, especially during a journey of the vehicle. The energy transferred to the delivery robots via the charging interfaces can be transferred in particular in the form of electrical energy and/or fuels (petrol, diesel, liquid hydrogen, liquid gas, etc.). The energy storage devices of the delivery robots are correspondingly accumulators or containers for receiving liquid or gaseous fuels. According to another advantageous design, the charging interfaces transfer energy to the delivery robots according to an inductive principle. Here, a constantly changing electromagnetic field is generated from an electrical energy source, which triggers an induction current in the receiver, which is used to charge an accumulator of a delivery robot in particular. A contactless charging of an accumulator can thus be realized advantageously. The loading interfaces are advantageously designed and set up in such a way that as soon as a delivery robot has taken up a designated position in the loading space of the vehicle and, for example, a release is given for the start of autonomous loading, the loading process begins and, if necessary, a mechanical contact between the vehicle and the delivery robot is automatically established via the loading interface.

According to another advantageous design, the charging interfaces have a mechanical interface for transmitting electrical energy to a delivery robot, which can autonomously establish an electrical contact between the delivery robot and one of the charging interfaces. The loading process of the delivery robots is advantageous without the intervention of an operator, i.e. autonomously possible.

According to another advantageous design, the vehicle has a loading space optimization system with optical sensors to detect the delivery robots present in the loading space, whereby the loading space optimization system controls the positioning of the delivery robots in the loading space via the communication interface. The loading space optimization system comprises an image evaluation processor to determine the current positioning of the delivery robots and a control unit that communicates with and can control the delivery robots in the loading space via the communication interface. The vehicle thus benefits from information on the number and position of the delivery robots in the vehicle's loading space, which makes it possible to control, check and optimize the loading space in particular.

According to a further advantageous design, the vehicle has a device for detecting and providing at least one of the following states in the vehicle:

Loading of the vehicle with delivery robots (this refers to the loading process),
Unloading of the delivery robots from the vehicle (this refers to the unloading process),
Number n of delivery robots already loaded in the vehicle,
Number F=N−n of the free receiving places for delivery robots in the vehicle,
Information about a route to be driven by the vehicle,
Information about a target position to be driven to by the vehicle,
Error messages from the vehicle.

This information shall be used to record an operational state of the vehicle in order to transmit it to a driver of the vehicle and/or to forward it to a central office. This information can still be used in the vehicle or in the central office to determine operational delays of the vehicle compared to a previously provided delivery schedule.

According to another advantageous design, the loading space of the vehicle has different levels for receiving the delivery robots. This enables an optimized use of the loading space.

According to another advantageous design, the loading space of the vehicle is designed to accommodate pallets already equipped with delivery robots. The pallets are advantageously designed in such a way that they fit into a drawer system in the hold. The pallets have an advantageous size that corresponds approximately to the floor area of the loading space, so that the number of inserted pallets equals the number of levels equipped with delivery robots in the loading space.

According to another advantageous design, the vehicle is equipped with a device for automatic loading and/or unloading of the delivery robots into/from the loading space. Depending on the type of delivery robot and vehicle, this may include a controllable ramp and/or a controllable lifting system and/or a take-off and landing platform and/or a docking and landing interface.

According to another advantageous design, the device for automatic loading and unloading of the vehicle is controlled by a control system of the vehicle depending on a manual input of a driver of the vehicle or automatically depending on the reaching of predetermined delivery positions.

According to another advantageous design, the vehicle has a warning device with which an acoustic and/or visual warning signal for an environment of the vehicle can be emitted before and/or during loading and/or unloading of the loading space. Here the vehicle has at least one electroacoustic transducer (loudspeaker, horn, etc.) and/or one or more light sources, an optical scoreboard, etc.

The proposed vehicle will allow a more efficient delivery of freight to the recipient. In particular, the proposed vehicle will allow parallel delivery of parcels to recipients.

A further aspect of the invention concerns a method of delivering parcels with a vehicle as described above and below to a plurality of locally distributed receivers in an environment of a location O2, the delivery robots each being adapted to receive a freight and autonomously transport it from the location O2 to a predetermined delivery address, deliver the freight and autonomously return to the location O2 to autonomously enter the hold of the vehicle. The method has the following steps.

In a first step, a number of m delivery robots are loaded with one freight each, with m≤n≤N. In a further step, the vehicle and the delivery robots loaded with the freight are made available at a location O1. In a further step, the loading space of the vehicle is automatically loaded with the m delivery robots loaded with freight at location O1. In a further step, the vehicle is driven from the location O1 to a location O2. In a further step, at least one of the delivery robots loaded with one freight each is automatically unloaded at the O2 location, whereby this delivery robot then travels autonomously from the O2 location to a predefined delivery address, delivers the freight and returns autonomously to the O2 location. In a further step, an autonomous loading of this delivery robot into the loading space of the vehicle takes place.

The delivery robots are preferably loaded with freight at location O1 (e.g. a freight center). The proposed vehicle will then be made available at location O1. It takes place at site O1 as preferably an automated, autonomous loading of the loading space of the vehicle with the delivery robots. The vehicle then drives from the location O1 to a location O2. Some or all of the recipient addresses of the freight are conveniently located in the vicinity of O2. One or more delivery robots leave the loading area of the vehicle and automatically control the respective recipient of their freight, deliver the freight and in turn control the vehicle automatically in order to reach the loading area of the vehicle automatically. Once there, the respective delivery robot is automatically fixed and, if necessary, charged with energy.

Advantages and advantageous further developments of the proposed methods result from an analogous and logical transfer of the above remarks made in connection with the vehicle.

Another aspect of the invention concerns a system for delivering freight to a variety of locally distributed recipients, including at least one vehicle as described above and below and several delivery robots each designed to do so:
- to take on a cargo,
- automatically enter and leave the vehicle's load compartment, and
- after leaving the hold, to autonomously transport their cargo to a predetermined delivery address, deliver the cargo, autonomously return to the vehicle and autonomously return to the hold.

Below is a list of further embodiments. Those will be indicated with a letter "C". Whenever such embodiments are referred to, this will be done by referring to "C" embodiments. FIGS. 5-7 and the corresponding description illustrate exemplary "C" embodiments. Also, further description relating to the "C" embodiments follows directly below them.

C1. A vehicle (301) for receiving a number n≤N of delivery robots (350) into a loading space (310) of the vehicle (301), wherein N is the number of maximum receivable delivery robots (350) in the loading space (310) and n is the number of delivery robots (350) currently present in the loading space (310):
  a fixing device (312) for automatically individually fixing N delivery robots (350) in the loading space (310),
  a communication interface (314) for the vehicle (301) to communicate with the n delivery robots (350),
  a loading device (330) for automatically loading N delivery robots (350) present in the loading space (310) with a respective freight from a freight storage region (332) of the vehicle (301), and
  a number N of charging interfaces (316) for individually charging energy stores of the n delivery robots (350) in the loading space (310).

C2. The vehicle (301) according to embodiment C1, wherein the loading device (330) comprises a shelf operating device with which freight is picked from a shelf system arranged in the freight storage area (332) for a respective delivery robot (350) and the latter is loaded and/or freight is automatically unloaded from a delivery robot (350) into the shelf system.

C3. The vehicle (301) according to any of embodiments C1 to C2, wherein the communication interface (314) communicates at least one of the following states of a respective one of the n delivery robots (350) to the vehicle (301):
  Loading condition of the respective delivery robot,
  Type of loading of the respective delivery robot,
  Position of the respective delivery robot,
  Delivery address reached,
  Available operating energy of the respective delivery robot,
  Error messages.

C4. The vehicle according to any of the embodiments C1 to C3, wherein a security device is provided in the cargo storage area to secure/fix the cargo present in the cargo storage area.

C5. The vehicle (301) according to any of embodiments C1 to C4, wherein the communication interface (314) communicates at least one of the following information from the vehicle (301) to one or more or all of the n delivery robots (350):
  Start signal for autonomous unloading of the respective delivery robot,
  Delivery address to be driven to by the respective delivery robot (350),
  Type of transfer,
  Parking position in vehicle (301) reached,
  Start charging with electrical energy.

C6. The vehicle (301) according to any of embodiments C1 to C5,
  Comprising a loading space optimization system (318) with optical sensors for detecting the delivery robots (350) present in the loading space (310), wherein the loading space optimization system (318) controls a positioning of the delivery robots (350) in the loading space (310) via the communication interface (314).

C7. The vehicle (301) according to any of embodiments C1 to C6, comprising a device (320) for detecting and communicating at least one of the following states in the vehicle (301):
  Loading the vehicle (301) with delivery robots (350),
  Unloading the delivery robots (350) from the vehicle (301),
  Status of the loading device (330),
  Number n of delivery robots (350) already loaded in the vehicle (301),
  Number F=N−n of the free receiving places for delivery robots (350) in the vehicle (301),
  Information on a route to be taken by the vehicle (301),
  Information about a target position to be driven to by the vehicle (301),
  Error messages.

C8. The vehicle (301) according to any of embodiments C1 to C7,
Wherein the fixing device (312) comprises one or more inflatable units for fixing the delivery robots (350).

C9. A method for delivering packages with a vehicle (301) in accordance with one of embodiments C1 to C8 to a plurality of locally distributed receivers in the surroundings of a location O2, comprising the following steps:
  Loading (S1') the freight storage area (332) with freight,
  Automatic picking (S2') and loading of a number m of the n delivery robots (350) each with one freight, with m≤n,
  Driving (S3') the vehicle (301) to a location O2,
  Automated unloading (S4') of at least one of the delivery robots (350), each loaded with a freight, at location O2, this delivery robot (350) then travelling autonomously from location O2 to a predetermined delivery address, delivering the freight and returning autonomously to location O2, and
  Autonomous loading (S5') of this delivery robot into the loading space (310) of the vehicle (301).

C10. A method for picking up a number n≤N of delivery robots (350), in particular with a vehicle according to one of the embodiments C1 to C8, into a loading space (310) of a vehicle (301), wherein N is the number of maximum picked-up delivery robots (350) in the loading space (310) and n is the number of delivery robots (350) currently present in the loading space (310):

Automatic and individual fixing of N delivery robots (350) in the loading space (310) by a fixing device (312), Communicating of the vehicle (301) with the n delivery robots (350) through a communication interface (314), Automatic loading of N delivery robots (350) present in the loading space (310) with a respective freight from a freight storage region (332) of the vehicle (301) by a loading device (330) and Individual charging of energy stores of the n delivery robots (350) in the hold (310) by a number N of charging interfaces (316).

C11. The method according to embodiment C10, wherein the loading device (330) comprises a storage and retrieval machine, with the freight being picked from a rack system arranged in the freight storage area (332) for a respective delivery robot (350) and the latter being loaded and/or freight being automatically unloaded into the rack system by a delivery robot (350) and/or in which a securing device for securing/fixing the freight present in the freight storage area is present in the freight storage area and/or the securing device (312) having one or more inflatable units which serve to fix the delivery robots (350).

C12. The method according to any of the embodiments C10 to C11, wherein the communication interface (314) communicates at least one of the following states of a respective one of the n delivery robots (350) to the vehicle (301):
Loading condition of the respective delivery robot,
Type of loading of the respective delivery robot,
Position of the respective delivery robot,
Delivery address reached,
Available operating energy of the respective delivery robot,
Error messages, and/or wherein the communication interface (314) communicates at least one of the following information from the vehicle (301) to one or more or all of the n delivery robots (350):
Start signal for autonomous unloading of the respective delivery robot,
Delivery address to be driven to by the respective delivery robot (350),
Type of transfer,
Parking position in vehicle (301) reached,
Start charging with electrical energy.

C13. The method according to any of the embodiments C10 to C12, comprising a loading space optimization system (318) with optical sensors for detecting the delivery robots (350) present in the loading space (310), the loading space optimization system (318) controlling a positioning of the delivery robots (350) in the loading space (310) via the communication interface (314).

C14. The method according to any of the embodiments C10 to C13, comprising the steps of detecting and communicating at least one of the following states in the vehicle (301):
Loading the vehicle (301) with delivery robots (350),
Unloading the delivery robots (350) from the vehicle (301),
Status of the loading device (330),
Number n of delivery robots already loaded (350) in the vehicle (301),
Number F=N−n of the free receiving places for delivery robots (350) in the vehicle (301),
Information on a route to be taken by the vehicle (301),
Information about a target position to be driven to by the vehicle (301),
Error messages.

C15. A system for delivering parcels to a plurality of locally distributed recipients comprising at least one vehicle (301) according to embodiments C1 to C8 and a plurality of delivery robots (350) each configured to:
receive a freight,
automatically enter and leave the loading space (310) of the vehicle (301), and
drive autonomously to a predetermined delivery address after leaving the loading space (310), to deliver the freight, to return autonomously to the vehicle (301) and to return autonomously to the loading space (310).

Below follows a textual description of the "C" embodiments.

A first aspect of the "C" embodiments concerns a vehicle or method for picking up a number n≤N of delivery robots in a hold of the vehicle, where N is the maximum number of delivery robots that can be picked up in the hold and n is the number of delivery robots currently present in the hold. The vehicle comprising: a fixing device for automatically individually fixing N delivery robots in the hold, a communication interface for the vehicle to communicate with the n delivery robots, an assembly device for automatically loading each of the N delivery robots present in the hold with a load from a freight storage area of the vehicle, and a number N of loading interfaces for individually charging energy stores of the n delivery robots in the hold.

The vehicle is preferably a truck, small van, van, delivery van or bus. However, the vehicle can also be a passenger car, rail vehicle, watercraft (e.g. ship), underwater vehicle or aircraft.

The term "delivery robot" is understood in the present case to mean in particular a self-driving delivery robot, a self-flying delivery robot (drone), a self-controlling floating vehicle, etc.

In particular, the freight is first loaded into a vehicle's freight storage.

The loading of the freight storage is advantageously automated via an interface to the freight storage. This freight storage can have individual compartments (e.g. shelves). Preferably, the loading of the n delivery robots present in the vehicle by the loading device can take place while the vehicle is stationary and/or while the vehicle is in motion.

In accordance with an advantageous design, the loading device of the vehicle is also designed and equipped for the automatic unloading of freight from N delivery robots present in the hold into the cargo storage area. This makes it possible, for example, to automatically unload the freight of delivery robots that return to the vehicle with a freight automatically from a customer into the freight storage area of the vehicle.

According to another advantageous design, the loading device of the vehicle comprises a storage and retrieval machine with which freight is picked from a rack system arranged in the freight storage area for a respective delivery robot and/or unloaded from a delivery robot into the rack system.

It is advantageous that several of the delivery robots can be loaded with freight at the same time using the loading device.

The energy storage devices of the delivery robots are advantageous electrical energy storage devices, i.e. accumulators. These are charged by applying an electric current with a certain voltage, preferably by direct current. Alternatively or additionally, the delivery robots can be driven by combustion engines, so that the energy storage units are advantageous fuel tanks in this case. The following fuels can be considered: petrol, hydrogen, liquefied petroleum gas, etc.

The loading space of the vehicle can preferably be accessible from the rear of the vehicle and/or from one side of the vehicle. In particular, the load compartment of the vehicle can be located behind and separated from a driver's cab. Access to the vehicle's loading space can be controlled and automatically opened and closed.

The delivery robots are advantageously designed and set up in such a way that they are controlled and checked automatically, advantageously completely autonomously, i.e. without direct control by a human operator. The delivery robots are therefore equipped in particular with a positioning and navigation system, as well as with a robot guidance computer, which takes over the control of the robot. The delivery robots can thus move autonomously from one position to another (e.g. the address of a parcel recipient) and return again. The robot guidance computer is provided with a current (2D-/3D-) route guidance on the basis of which the delivery robots are controlled. The delivery robots are advantageously equipped with a sensor system for recording the current environment, as well as an evaluation unit for evaluating the recorded environmental data with regard to existing obstacles. The data is also used advantageously to control the delivery robot.

The vehicle is equipped, in accordance with the invention, with a fixing device to hold the picked up and carried delivery robots in the hold in a certain position, even if acceleration due to travel occurs. In accordance with an advantageous design, the vehicle's fixing device is also designed to fix delivery robots already loaded with freight. This is an advantage when it comes to fixing loaded and thus more massive delivery robots. The automatic fixation device can have a mechanical fixation, for example by engaging fixation hooks, by an automatic fixation by belts, etc.

In accordance with an advantageous design, the fixing device has one or more inflatable units which serve to fix the delivery robots. The fixing of the delivery robots is done by a mechanical clamping at the respective position in the vehicle by means of the inflated units. The inflatable units can be filled with a liquid and/or gaseous medium or the liquid or gaseous medium can be released from the units, whereby in the "inflated state" of the units, the unit is filled with the respective medium. The fixing device can comprise one or more individual, for example cushion-shaped inflatable units for each delivery robot. Alternatively, several delivery robots can be fixed in the hold, for example with an inflatable unit with an advantageous mattress shape. The inflatable units attach themselves to the respective outer contours of the delivery robots for fixing in the "inflated state", so that differently shaped delivery robots can be fixed with similar reliability. In other words, the inflatable units are not tied to a specific construction or outer contour of the delivery robot in order to fix it reliably in the loading space of the vehicle.

The inventive communication interface is used for communication between the vehicle and the delivery robots in order to transmit information between the vehicle and the delivery robots. The vehicle's communication interface uses a Bluetooth, WiFi, GSM, UMTS, or LTE connection for this purpose.

In an advantageous design, the delivery robots communicate at least one of the following states of a respective delivery robot to the vehicle via the communication interface:
  Loading condition of the respective delivery robot,
  Type of freight (e.g. post/parcel/registration etc.) of the respective delivery robot,
  Identification of the respective freight,
  Position of the respective delivery robot,
  Delivery address reached,
  Available operating energy of the respective delivery robot,
  Error message of the respective delivery robot.

It is advantageous to provide each freight with a unique identifier for identification purposes, for example in the form of a readable RFID chip. This means that the current location of each freight until it is delivered to a recipient can be recorded and communicated to the vehicle.

In another advantageous design, the vehicle communicates via the communication interface at least one of the following information to one or more or all of the n delivery robots:
  Start signal for autonomous unloading of the respective delivery robot(s),
  Delivery address to be controlled by the respective delivery robot,
  Type of handover (storage of cargo with/without interaction with the recipient)
  Parking position in vehicle reached,
  Start of a charging process with energy.

This communication serves to provide the respective delivery robot, for example, with all the information required for delivery of the respective parcel or freight to a recipient. In addition, operational information, such as completion of an automatic unloading process of the delivery robot from the vehicle, start of an automatic loading process of the delivery robot on the vehicle, reaching a parking position of the delivery robot in the vehicle, start of an automatic charging process with energy, etc. can be provided from the vehicle to the respective delivery robot. Based on this information received from the vehicle, automatic control routines can, for example, be started in the respective delivery robot.

The vehicle also has an advantageous communication interface with a control center. Via this interface, some or all of the information available in the vehicle, for example on the condition of the vehicle, on the condition of the delivery robots, etc., can be advantageously transmitted from the vehicle to the control center. In addition, information, such as changes to the route of the vehicle, changes to freight-specific data, in particular the recipient data of a freight, etc., can be transmitted from the control center to the vehicle.

The above-mentioned N charging interfaces of the vehicle enable an individual automatic charging of energy storage devices of the delivery robots in the loading space of the vehicle in order to supply the delivery robots with new energy or to recharge them, especially during a journey of the vehicle. The energy transferred to the delivery robots via the charging interfaces can be transferred in particular in the form of electrical energy and/or fuels (petrol, diesel, liquid hydrogen, liquid gas, etc.). The energy storage devices of the delivery robots are correspondingly accumulators or containers for receiving liquid or gaseous fuels. According to another advantageous design, the charging interfaces transfer energy to the delivery robots according to an inductive principle. Here, a constantly changing electromagnetic field is generated from an electrical energy source, which triggers an induction current in the receiver, which is used to charge an accumulator of a delivery robot in particular. A contactless charging of an accumulator can thus be realized advantageously. The loading interfaces are advantageously designed and set up in such a way that, as soon as a delivery robot has taken up a designated position in the loading space of the vehicle and, for example, a release has been given for the start of autonomous loading, the loading process begins and, if necessary, a mechanical contact between the vehicle and the delivery robot is automatically established via the loading interface.

According to another advantageous design, the charging interfaces have a mechanical interface for transmitting electrical energy to a delivery robot, which can autonomously establish an electrical contact between the delivery robot and one of the charging interfaces. The loading process of the delivery robots is advantageous without the intervention of an operator, i.e. autonomously possible.

According to another advantageous design, the vehicle has a loading space optimization system with optical sensors to detect the delivery robots present in the loading space, whereby the loading space optimization system controls the positioning of the delivery robots in the loading space via the communication interface. The loading space optimization system comprises an image evaluation processor to determine the current positioning of the delivery robots and a control unit that communicates with and can control the delivery robots in the loading space via the communication interface. The vehicle thus benefits from information on the number and position of the delivery robots in the vehicle's loading space, which makes it possible to control, check and optimize the loading space in particular.

According to a further advantageous design, the vehicle has a device for detecting and communicating at least one of the following states in the vehicle:
  Loading of the vehicle with delivery robots (this refers to the loading process),
  Unloading the delivery robots from the vehicle (this refers to the unloading process),
  Status of the loading device (number of packages, free spaces for loading packages, etc.)
  Number n of delivery robots already loaded in the vehicle,
  Number F=N−n of the free receiving places for delivery robots in the vehicle,
  Information about a route to be driven by the vehicle,
  Information about a target position to be driven to by the vehicle,
  Error messages from the vehicle.

This information shall be used to record an operational state of the vehicle in order to transmit it to a driver of the vehicle and/or to forward it to a control center. This information can still be used in the vehicle or in the control center to determine operational delays of the vehicle compared to a previously provided delivery schedule.

According to another advantageous design, the loading space of the vehicle has different levels for receiving the delivery robots. This enables an optimized use of the loading space.

According to another advantageous design, the loading space of the vehicle is designed to accommodate pallets already equipped with delivery robots. The pallets are advantageously designed in such a way that they fit into a drawer system in the hold. The pallets have an advantageous size that corresponds approximately to the floor area of the loading space, so that the number of inserted pallets equals the number of levels equipped with delivery robots in the loading space.

According to another advantageous design, the vehicle is equipped with a device for automatic loading and/or unloading of the delivery robots into/from the loading space. Depending on the type of delivery robot and vehicle, this may include a controllable ramp and/or a controllable lifting system and/or a take-off and landing platform and/or a docking and landing interface.

According to another advantageous design, the device for automatic loading and unloading of the vehicle is controlled by a control system of the vehicle depending on a manual input of a driver of the vehicle or automatically depending on the reaching of predetermined delivery positions.

According to another advantageous design, the vehicle has a warning device with which an acoustic and/or visual warning signal for an environment of the vehicle can be emitted before and/or during loading and/or unloading of the loading space. Here the vehicle has at least one electroacoustic transducer (loudspeaker, horn, etc.) and/or one or more light sources, an optical scoreboard, etc.

The proposed vehicle will allow a more efficient delivery of freight to the recipient. In particular, the proposed vehicle will allow parallel delivery of parcels to recipients.

Another aspect of the invention concerns a method of delivering parcels by vehicle, as described above, to a variety of locally distributed receivers in an environment of a location O2, using the following steps.

In one step, the freight storage area is loaded with freight. In a further step, automatic order picking and loading of a number m of the n delivery robots is carried out with one freight each, with m≤n≤N. In a further step, the vehicle is driven to a location O2. In a further step, at least one of the delivery robots loaded with one freight each is automatically unloaded at the O2 location, whereby this delivery robot then travels autonomously from the O2 location to a predefined delivery address, delivers the freight and returns autonomously to the O2 location. In a further step, this delivery robot is autonomously loaded into the loading space of the vehicle.

To load the vehicle or the freight storage area, the vehicle is provided at a location O1 (e.g. a freight center). The freight storage area is then preferably automatically loaded with freight at location O1. The vehicle's loading device then automatically loads freight, preferably autonomously, into delivery robots available in the vehicle. For this purpose, the delivery robots are either already present in the loading space of the vehicle or are advantageously fully or partially automated at location O1 and autonomously loaded into the loading space of the vehicle. The vehicle then drives from the location O1 to a location O2. Some or all of the recipient addresses of the freight are conveniently located in the vicinity of O2. One or more delivery robots leave the loading area of the vehicle and automatically control the respective recipient of their freight, deliver the freight, and in turn control the vehicle automatically in order to reach the loading area of the vehicle automatically. Once there, the respective delivery robot is automatically fixed and, if necessary, charged with energy. Furthermore, the loading device is preferably used to unload freight from delivery robots into the freight storage area of the vehicle.

After the vehicle has delivered or picked up freight on a given route, for example at several locations O2 by means of the delivery robots, the vehicle preferably returns to a freight center O1 in order to unload freight existing in the freight storage area to the freight center and, if necessary, pick up new freight.

Advantages and advantageous further training of the proposed methods result from an analogous and logical transfer of the above remarks made in connection with the vehicle.

Another aspect of the invention concerns a system for delivering parcels to a variety of locally distributed recipients, including at least one vehicle as described above and several delivery robots, each of which is designed to do so:

to receive a freight, automatically enter and leave the hold of the vehicle and, after leaving the hold, autonomously drive to a predetermined delivery address, deliver the freight, autonomously return to the vehicle and autonomously return to the hold.

Advantages and advantageous developments of the proposed methods result from the analogous and logical transfer of the disclosures above in the context of the proposed system.

Further advantages, features and details result from the following description, in which—if applicable with reference to the drawing—at least one example of execution is described in detail. Identical, similar and/or functionally identical parts have the same reference numbers.

The representations in the figures are schematic and not to scale.

Figure 1:
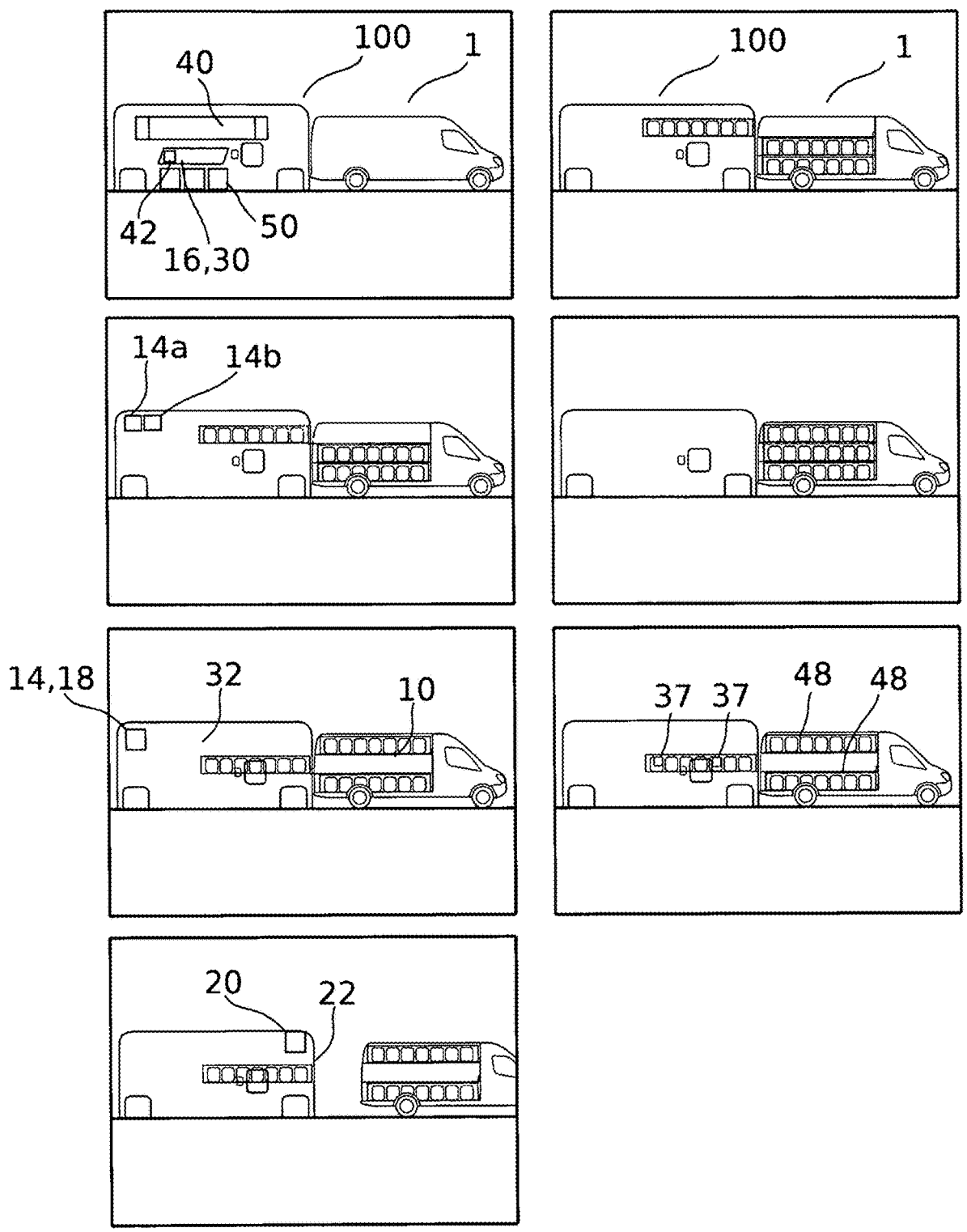
FIG. 1 shows a mobile freight station and a freight vehicle as part of a system for distributing, delivering and collecting freight according to an exemplary embodiment of the invention.

FIG. 1 shows a freight vehicle 1 and a freight station 100 in each respective subfigure. A freight vehicle 1 and a freight station 100 from the I freight stations 100 and the vehicles are discussed, wherein both of the freight vehicle 1 and the freight station 100 are part of a system for distributing, delivering and collecting freight. The mobile freight station 100 has a number $n_i \le N_i$, with i=1, ..., I, of delivery robots 50, where $N_i$ is the maximum number of delivery robots 50 present in the freight station 100 and $n_i$ is the number of delivery robots 50 that are currently present in the freight station 100. The delivery robots 50 each autonomously transport a freight to a specified address of a recipient or sender of the freight in an environment of the respective freight station 100, in order to deliver the respective freight there or to pick up a freight there and to autonomously return to the freight station 100. The freight station 100 respectively comprises a number of $N_i$ charging interfaces 16 for the individual automated charging of energy storage devices of the delivery robots 50. The energy storage devices are rechargeable electrical energy sources, also denoted by accumulators. These are charged by direct current with a certain voltage that is applied. Furthermore, the freight station 100 in the system comprises a loading device 30 for automatically loading the $N_i$ delivery robots 50 with a freight from the freight storage 32 and automatically unloading a freight from the $N_i$ delivery robots 50 into the freight storage 32. The freight itself is delivered by the freight vehicle 1 to the freight station 100, or received by a first freight station 100 and transported to a destination freight station 100. The mobile freight station 100 has a first interface 22 for automatic loading of freight into the freight vehicle 1 from a freight storage 32 of the mobile freight station 100 as well as for automatic unloading of freight from the freight vehicle 1 into the freight storage 32. The freight vehicle 1 automatically loads the freight in a storage space 10 via the interface 22 of the freight station 100 and automatically secures and fixes the freight in the storage space 10 of the freight vehicle 1. Furthermore, the freight station 100 is equipped with a first communication interface 14a for communicating with the $n_i$ delivery robots 50 and a second communication interface 14b for communicating with the freight vehicle 1, wherein the respective communication interface 14a, 14b preferably uses a local WiFi or GSM connection. A control unit 20 in the freight station 100 serves to control the first interface 22, the loading device 30 and the $n_i$ delivery robots 50. The loading device 30 in the freight station 100 comprises a storage and retrieval machine 42. With this storage and retrieval machine 42, freight is picked from a shelving system 40 arranged in the freight storage 32 for a respective delivery robot 50 or freight is automatically unloaded from one of the delivery robots 50 into the rack system 40. Furthermore, several pieces of freight are arranged in freight vehicle 1 on a freight pallet 48, wherein freight pallets 48 respectively with or without freight are exchanged during loading or unloading of the freight via the first interface 22. In particular for the purpose of shipment tracking or logistics optimization, each of the freight items is equipped with a data storage 37. The data storage 37 contains in particular the address of a recipient or a sender of the respective freight, the identification of one of the I freight stations 100 as the destination station and the identification of several freight stations 100 on the way to the destination station. Furthermore, the freight station 100 is equipped with a freight storage optimization system 18, which is equipped with optical sensors, in particular cameras, which detect delivery robots 50 present in the freight storage 32. Based on this information, the freight storage optimization system 18 uses a transmitter 14 to control the positioning of the delivery robot 50 in the freight storage system 32. The freight vehicle 1 is sized from a van to a small truck.

Although the invention was illustrated and explained in detail by preferred examples of execution, the invention is not limited by the disclosed examples and other variations can be derived by the skilled person without leaving the scope of protection of the invention. It is therefore clear that a multitude of possible variations exists. It is also clear that the embodiments mentioned as examples are really only examples which are not to be understood in any way as limiting the scope of protection, the application possibilities or the configuration of the invention. Rather, the preceding description and the figure description enable the skilled person to concretely implement the exemplary forms of execution, whereby the skilled person, being aware of the disclosed idea of invention, can make numerous changes, for example with regard to the function or arrangement of individual elements named in an exemplary form of execution, without leaving the scope of protection defined by the claims and their legal correspondences, such as further explanations in the description.

Figure 2A:
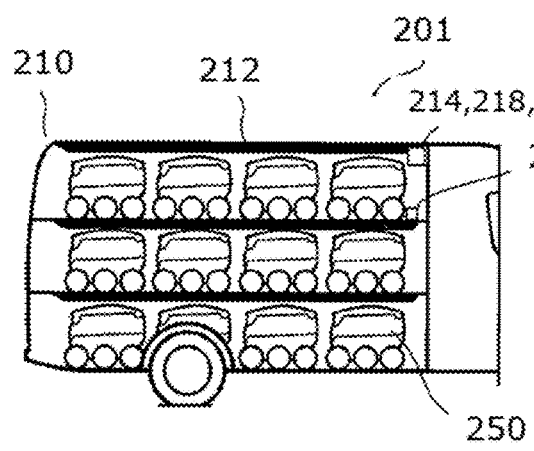
FIGS. 2a-2b show a vehicle with self-driving delivery robots according to an example of the invention.
Figure 2B:
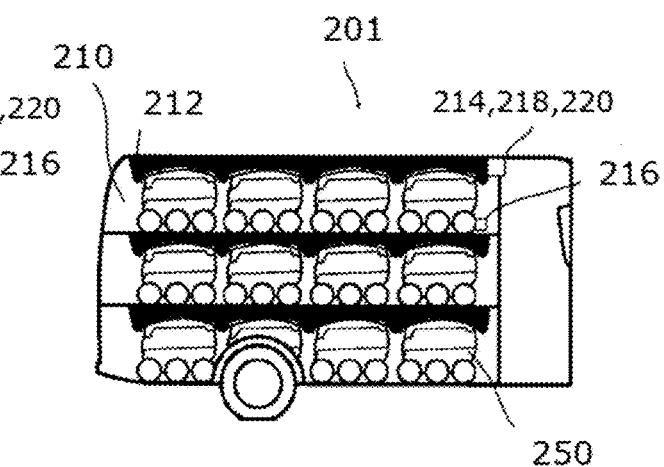

FIG. 2a and FIG. 2b each show a vehicle 201 for picking up a number n of self-driving delivery robots 250 in a hold 210 of vehicle 201. Vehicle 201 has inflatable cushions as a fixing device 212 for automatically fixing the delivery robots 250 individually in hold 210. In FIG. 2a the delivery robots 250 are loaded in the loading space 210 of vehicle 201, but are not yet secured by the fixing device 212, as the cushions are not yet filled with air or any other gas. FIG. 2b, however, shows the cushions of the fixing device 212 in an inflated state, whereby the delivery robots 250 are held in a predetermined position by the fixing device 212 to prevent the delivery robots 250 from moving relative to vehicle 201 during a journey of vehicle 201. In particular, the fixing device 212 is designed in such a way that it can also fix delivery robots 250 already loaded with freight. Furthermore, vehicle 201 has a communication interface 214 for vehicle 201 to communicate with the n delivery robots 250. The communication interface 214 communicates at least the following states with at least one of the n delivery robots 250 to vehicle 201: loading state of the respective delivery robot 250, type of loading of the respective delivery robot 250, the position of the respective delivery robot 250, the state "delivery address reached" upon occurrence of the respective event, available operating power of the respective delivery robot 250 and any error messages. The communication interface 214 preferably uses a local WLAN for connection to the vehicle 201. Furthermore, the communication interface 214 communicates the following information from vehicle 201 to at least one of the n delivery robots 250: start signal for autonomous unloading of the respective delivery robot 250, the delivery address to be driven to by the respective delivery robot 250, type of transfer, the status "Parking position in vehicle 201 reached" and the status "Start charging process with electrical energy". For charging batteries of the delivery robot 250, a number N of charging interfaces 216 for individual charging of the n delivery robot 250 is available in the loading space 210 of vehicle 201. The charging interfaces 216 transmit the electrical energy according to an inductive principle. This induction current, which is generated by time-varying electromagnetic fields, charges the batteries of the delivery robots 250. A mechanical interface for transmitting electrical energy to a delivery robot 250 is available for this purpose, which can autonomously establish an electrical contact between the delivery robot 250 and one of the charging interfaces 216. A loading space optimization system 218 also uses optical sensors, preferably one or more cameras, to detect those n delivery robots 250 that are located in loading space 210 of vehicle 201. The information as to which receiving stations for delivery robot 250 in vehicle 201 are already occupied is forwarded by the loading space optimization system 218 to a computer of vehicle 201, whereby the loading space optimization system 218 controls the positioning of the delivery robot 250 in loading space 210 via the communication interface 214. The delivery robots 250 are thus given a command as to which of the respective receiving stations the respective delivery robot 250 is to take. From the number n of already loaded delivery robots 250 in vehicle 201, the information about the loading of vehicle 201 with delivery robots 250, the information about the unloading of the delivery robots 250 from the vehicle 201, the number F=N−n of the free reception places for delivery robots 250 in vehicle 201 and information about a route to be driven by vehicle 201 with the corresponding target positions to be driven to by vehicle 201, a delivery process can be optimized. This information shall in particular be provided by a device 220 for the collection and provision of such information.

Figure 3:
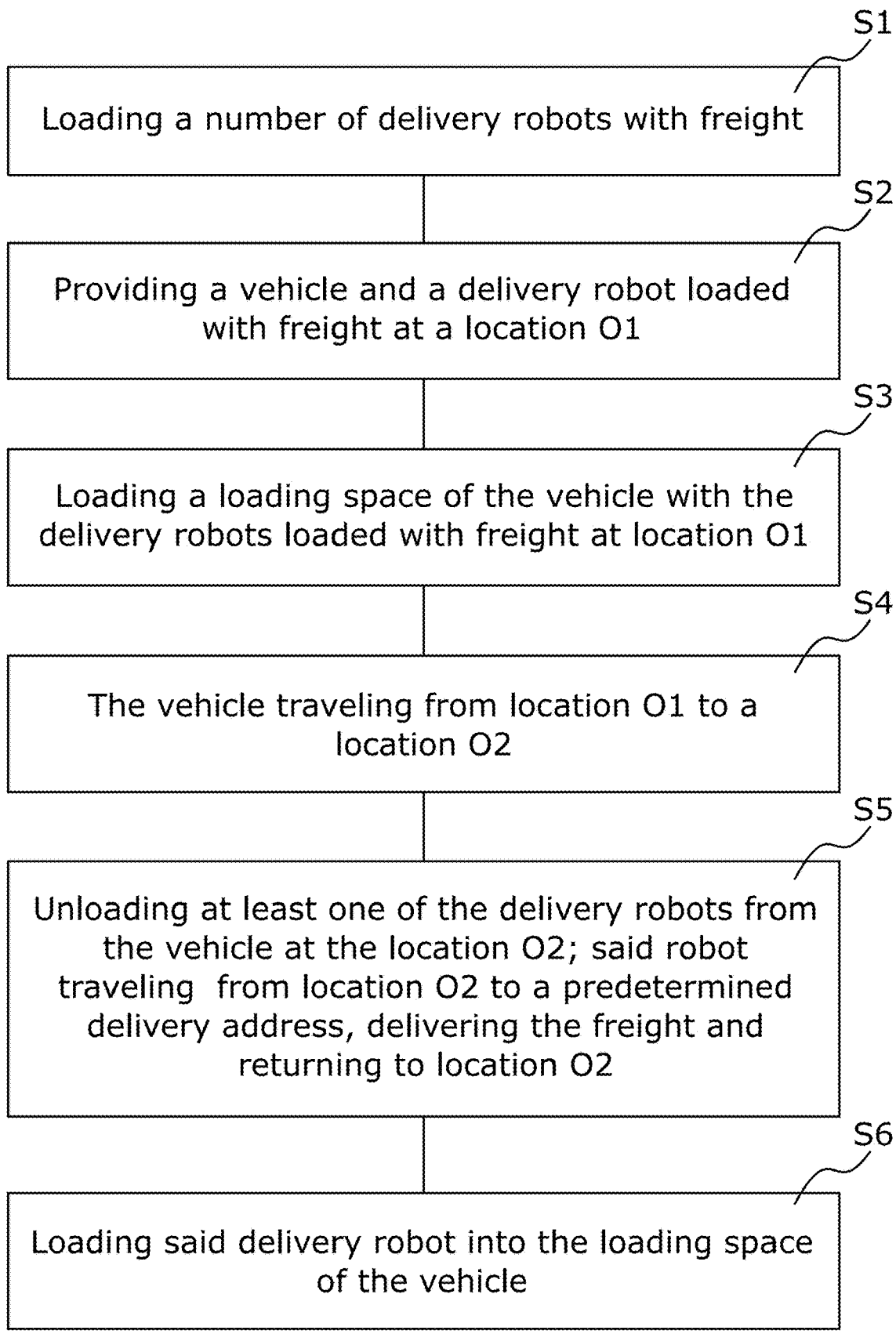
FIG. 3 shows a method for delivering packages with a vehicle according to another execution example of the invention.

FIG. 3 shows a method of delivering packets with a vehicle 201 to a plurality of locally distributed recipients in an environment of a location O2. The delivery robots 250 are each designed to pick up a load and drive autonomously from the location O2 to a specified delivery address, deliver the load and return autonomously to the location O2 in order to autonomously reach loading space 210 of vehicle 201. In a first step S1, a number of delivery robots 250 are each loaded with one freight. In a second step, S2, vehicle 201 and a delivery robot 250 loaded with freight will be provided at a location O1. In a third step, S3, automated loading of loading space 210 of vehicle 201 with the m delivery robots 250 loaded with freight takes place at location O1. Furthermore, the vehicle 201 travels from location O1 to a location O2 in a fourth step S4 in order to have an automated unloading of at least one of the delivery robots 250, each loaded with a freight, carried out at location O2 in a fifth step S5, wherein this delivery robot 250 then travels autonomously from location O2 to a predetermined delivery address, delivers the freight and returns autonomously to location O2. In the final sixth step S6, an autonomous loading of this delivery robot 250 into the loading space 210 of vehicle 201 takes place.

Figure 4:
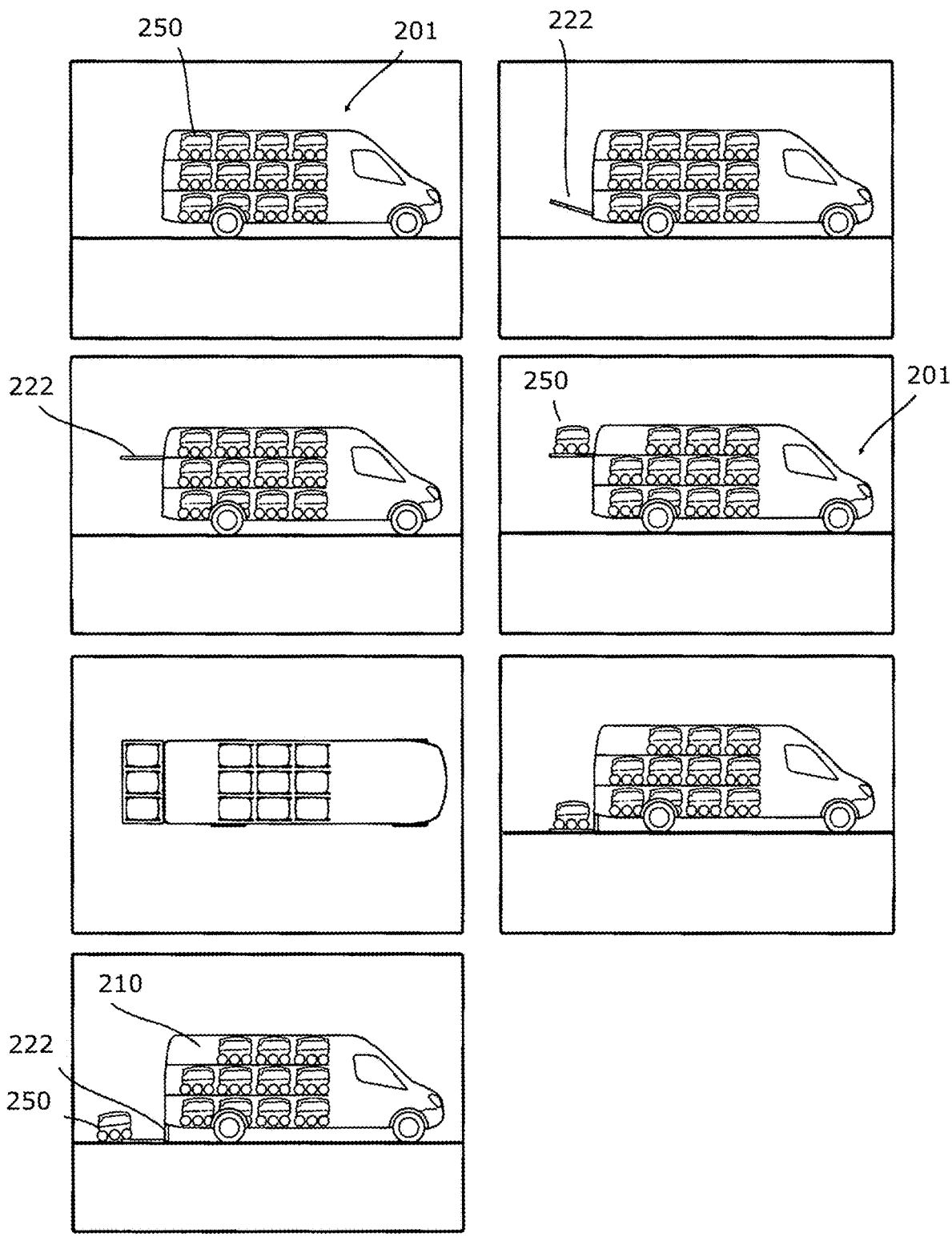
FIG. 4 shows a vehicle with self-driving delivery robots according to another example of the invention.

FIG. 4 shows a vehicle 201 in different views or in different states in each of the subfigures. The loading space 210 of vehicle 201 has different levels for receiving the delivery robots 250. In particular, the delivery robots 250 are arranged on pallets. Vehicle 201 is equipped with a device 222 for automatic loading and/or unloading of delivery robots 250 into/from loading space 210. For this purpose, the device 222 for automatic loading and/or unloading is equipped with a controllable ramp and/or a controllable lifting system. This ramp is controlled depending on a manual input of a driver of vehicle 201 or automatically depending on the reaching of predefined delivery positions. If the ramp is actuated and/or if loading and/or unloading of loading space 210 takes place, at least one acoustic warning signal for an environment of vehicle 201 is emitted by a warning device, in particular at the start of loading and/or unloading of loading space 210.

In particular, vehicle 201 is part of a system for delivering parcels to a large number of locally distributed recipients. The delivery robots 250, which are also part of the system, pick up a load, automatically drive into hold 210 of vehicle 201 and leave it automatically when vehicle 201 has reached a corresponding area where one or more of the recipients assigned to the parcels in the respective delivery robot 250 are located. After leaving hold 210, the delivery robots 250 drive autonomously to a specified delivery address, deliver the freight and return autonomously to vehicle 201 to return autonomously to hold 210 of vehicle 201.

Figure 5:
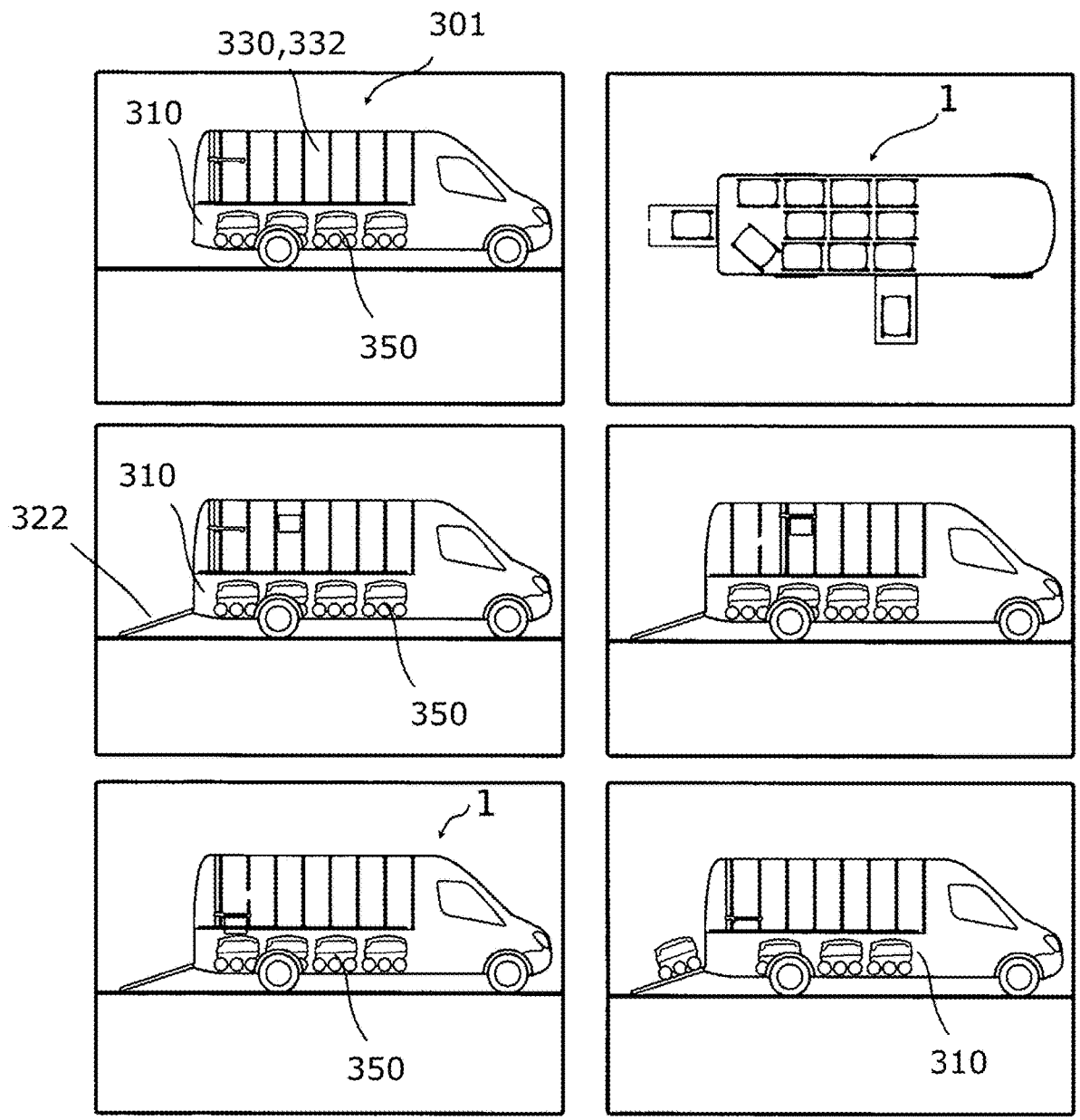
FIG. 5 a vehicle for receiving self-driving delivery robots according to an example of the invention.

FIG. 5 shows a vehicle 301 in different views or in different states in each of the subfigures. The loading space 310 of vehicle 301 has a level for receiving the delivery robots 350. In particular, the delivery robots 350 are arranged on pallets. Vehicle 301 is equipped with a device 322 for automatic loading and/or unloading of delivery robots 350 into/from loading space 310. For this purpose, the device 322 for automatic loading and/or unloading is equipped with a controllable ramp and/or a controllable lifting system. This ramp is controlled depending on a manual input of a driver of vehicle 301 or automatically depending on the reaching of predefined delivery positions. If the ramp is actuated and/or if loading and/or unloading of loading space 310 takes place, at least one acoustic warning signal for an environment of vehicle 301 is emitted by a warning device, in particular at the start of loading and/or unloading of loading space 310.

The freight storage area 332 and the loading device 330 are preferably located above the loading space 310 in the interior of the vehicle. Thus, the delivery robots 350, the storage compartment of which is accessible, in particular, from above, for parcels, are practically placed on a height similar to that of the automatic loading and/or unloading device 322.

In particular, vehicle 301 is part of a system for delivering parcels to a large number of locally distributed receivers. The delivery robots 350, which are also part of the system, pick up a load, automatically drive into hold 310 of vehicle 301 and leave it automatically when vehicle 301 has reached a corresponding area where one or more of the recipients assigned to the parcels in the respective delivery robot 350 are located. After leaving hold 310, the delivery robots 350 drive autonomously to a specified delivery address, deliver the freight and return autonomously to vehicle 301 to return autonomously to hold 310 of vehicle 301.

Figures 6A, 6B:
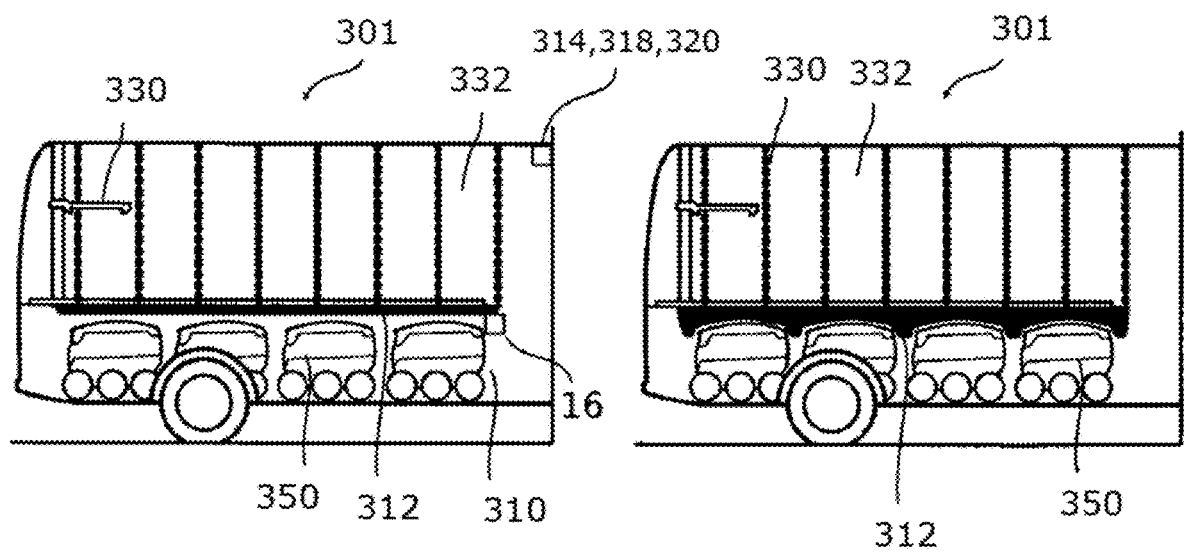
FIGS. 6a-6b show a vehicle for picking up self-driving delivery robots according to another example of the invention.

FIG. 6a and FIG. 6b each show a vehicle 301 for picking up a number n of self-driving delivery robots 350 in a hold 310 of vehicle 301. Vehicle 301 has inflatable cushions as a fixing device 312 for automatically fixing the delivery robots 350 individually in hold 310. In FIG. 6a the delivery robots 350 are loaded in the loading space 310 of vehicle 301, but are not yet secured by the fixing device 312, as the cushions are not yet filled with air or any other gas. FIG. 6b, however, shows the cushions of the fixing device 312 in an inflated state, whereby the delivery robots 350 are held in a predetermined position by the fixing device 312 to prevent the delivery robots 350 from moving relative to vehicle 301 during a journey of vehicle 301. In particular, the fixing device 312 is designed in such a way that it can also fix 50 delivery robots already loaded with freight. Furthermore, vehicle 301 has a communication interface 314 for the vehicle 301 to communicate with the n delivery robots 350. The communication interface 314 communicates at least the following states with at least one of the n delivery robots 350 to vehicle 301: loading state of the respective delivery robot 350, type of loading of the respective delivery robot 350, the position of the respective delivery robot 350, the state "delivery address reached" upon occurrence of the respective event, available operating power of the respective delivery robot 350 and any error messages. The communication interface 314 preferably uses a local WLAN for connection to the vehicle 301. Furthermore, the communication interface 314 communicates the following information from vehicle 301 to at least one of the n delivery robots 350: start signal for autonomous unloading of the respective delivery robot 350, the delivery address to be driven to by the respective delivery robot 350, type of transfer, the status "Parking position in vehicle 301 reached" and the status "Start charging process with electrical energy". For charging batteries of the delivery robot 350, a number N of charging interfaces 316 for individual charging of the n delivery robot 350 is available in the loading space 310 of vehicle 301. The charging interfaces 316 transmit the electrical energy according to an inductive principle. This induction current, which is generated by time-varying electromagnetic fields, charges the batteries of the delivery robots 350. A mechanical interface for transmitting electrical energy to a delivery robot 350 is available for this purpose, which can autonomously establish an electrical contact between the delivery robot 350 and one of the charging interfaces 316. A loading space optimization system 318 also uses optical sensors, preferably one or more cameras, to detect those n delivery robots 350 that are located in loading space 310 of vehicle 301. The information as to which receiving stations for delivery robot 350 in vehicle 301 are already occupied is forwarded to vehicle 301 by the loading space optimization system 318 to a computer of vehicle 301, whereby the loading space optimization system 318 controls a positioning of the delivery robot 350 in loading space 310 via the communication interface 314. The delivery robots 350 are thus given a command as to which of the respective receiving stations the respective delivery robot 350 is to take. From the number n of already loaded delivery robots 350 in vehicle 301, the information about the loading of vehicle 301 with delivery robots 350, the information about the unloading of vehicle 301 by delivery robots 350, the number F=N−n of the free reception places for delivery robots 350 in vehicle 301 and information about a route to be driven by vehicle 301 with the corresponding target positions to be driven to by vehicle 301, a delivery process can be optimized. This information shall in particular be provided by a device 320 for the collection and communication of such information. A loading device 330 automatically loads the delivery robots 350 present in loading space 310 with one freight each from a freight storage area 332 of vehicle 301, especially during a journey of vehicle 301. Furthermore, the loading device 330 has a storage and retrieval machine. The storage and retrieval machine is responsible in particular for loading the delivery robots 350 with freight from the freight storage area 332. For this purpose, the rack system has various levels in which the freight is stored in order to be picked for a respective delivery robot 350 and/or unloaded into the rack system by a delivery robot 350.

Figure 7:
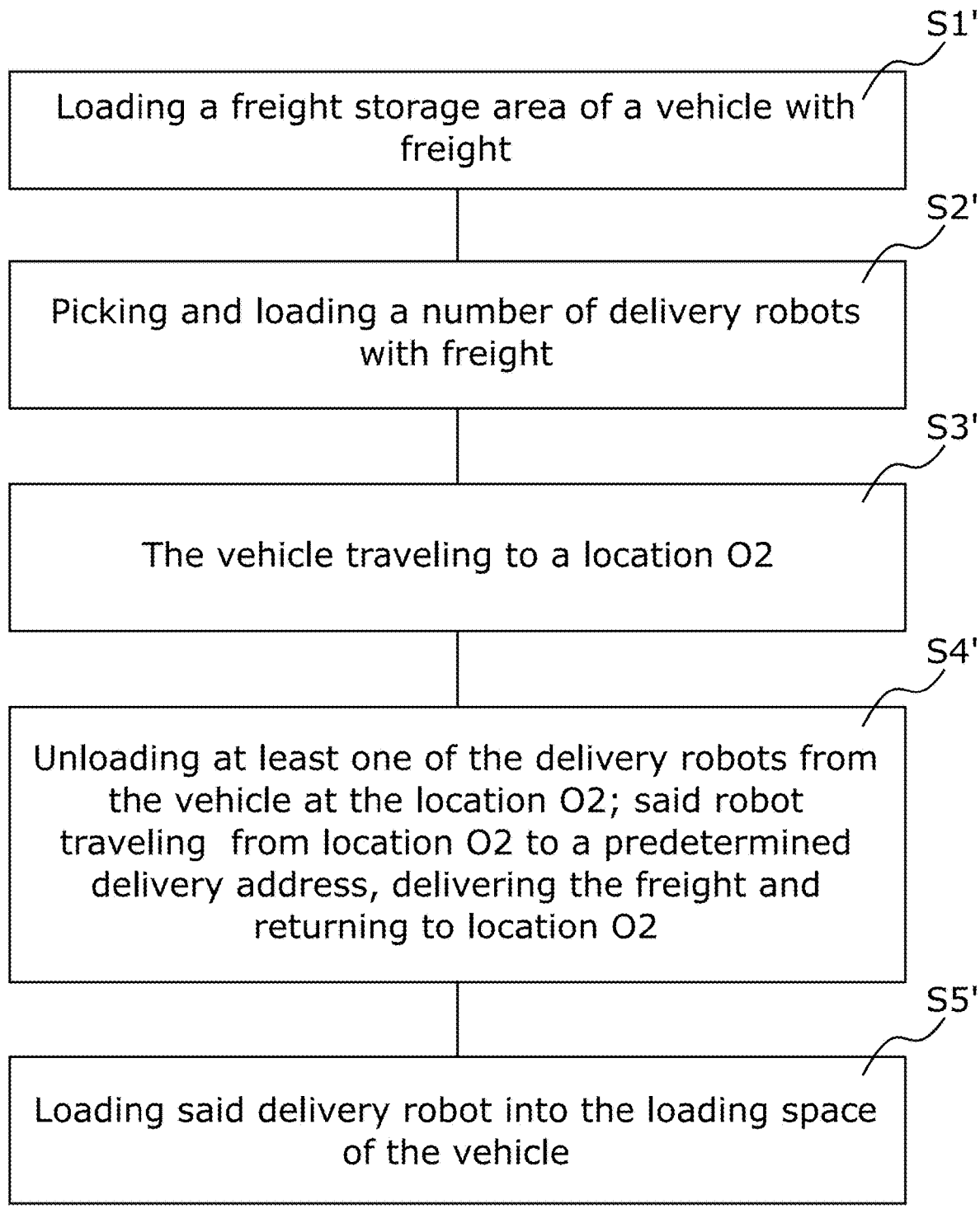
FIG. 7 shows a method for delivering packages with a vehicle according to another example of the invention.

FIG. 7 shows a method of delivering packets with a vehicle 301 to a plurality of locally distributed receivers in an environment of a location O2. In a first step S1' of the method, a freight storage area 332 is loaded with freight. In a second step, S2', automatic picking and loading of a number m of the n delivery robots 350 each with one freight takes place, whereby the following applies: m≤n. In a third step S3', the vehicle 301 travels to a location O2, wherein in a fourth step S4' the automated unloading of at least one of the delivery robots 350, each loaded with a freight, takes place at the location O2, wherein this delivery robot 350 then travels autonomously from the location O2 to a predetermined delivery address, delivers the freight and returns autonomously to the location O2. In a final fifth step, S5', this delivery robot 350 is autonomously loaded into loading space 310 of vehicle 301.

We claim:

1. A system for distributing, delivering, and collecting freight, having a number I of mobile freight stations, having I≥1, which each has a first interface for automatically loading freight into freight vehicles from a freight storage of the mobile freight station and for automatically unloading freight from freight vehicles into the freight storage, wherein
   the freight vehicles are arranged and executed for automatically loading and/or unloading freight via the first interface and for automatically securing and fixing freight in a storage space of the freight vehicles, wherein the freight vehicles comprise a security device provided in the freight storage space to secure and fix the freight present in the freight storage space,
   the mobile freight stations each have a number $n_i \leq N_i$, with i=1, . . . , I, of delivery robots, where $N_i$ is the maximum number of delivery robots present in the ith freight station and ni is the number of delivery robots currently present in the ith freight station, and the I freight stations each have a loading device for automatically loading the Ni delivery robots with a respective freight from the freight storage and for automatically unloading a respective freight from the Ni delivery robots into the freight storage.

2. The system according to claim 1, wherein the loading device comprises a storage and retrieval machine with which freight is picked from a shelving system arranged in the freight storage for a respective delivery robot and/or freight is automatically unloaded from a delivery robot into the shelving system.

3. The system according to claim 1, wherein the freight vehicles transport a plurality of pieces of freight on a freight pallet, freight pallets being exchanged during loading or unloading of freight via the first interface.

4. The system according to claim 1, wherein each cargo comprises a data storage storing one or more of the following information:
identifier of one of the I freight stations as target station, and/or
identification of several freight stations on the way to the destination station.

5. The system according to claim 4, wherein said data storage in each cargo also stores an address of a recipient and/or sender.

6. The system according to claim 1, wherein the ni delivery robots are adapted and arranged to autonomously transport freight to a predetermined address in surroundings of the respective freight station i, deliver a respective freight at the predetermined address and/or receive a freight at the predetermined address and autonomously return to the freight station i.

7. The system according to claim 1, wherein the I freight stations each have a number Ni of charging interfaces for the individual automated charging of energy storage devices of the delivery robots.

8. The system according to claim 1, wherein the I freight stations each have a first communication interface for communicating with the ni delivery robots and a second communication interface for communicating with the freight vehicles.

9. The system according to claim 1, further comprising a freight storage optimization system and with optical sensors for detecting the delivery robots present in the freight storage, the freight storage optimization system controlling a positioning of the delivery robots in the freight storage via a transmitter.

10. The system according to claim 9, wherein the freight storage optimization system comprises an image analysis processor to determine current positioning of the delivery robots and a control unit that communicates with and controls the delivery robots in the mobile freight station via the transmitter.

11. The system according to claim 1, wherein the mobile freight stations are ground-based vehicles, particularly trucks, vans, buses.

12. A mobile freight station for distributing, delivering, and collecting freight, comprising:
a first interface constructed and adapted to automatically load freight into freight vehicles from a freight storage of the mobile freight station and for automatically unloading freight from freight vehicles into the freight storage;
a number n≤N of delivery robots, where N is the maximum number of delivery robots present in the freight station, and n is the number of delivery robots currently present in the freight station;
a loading device constructed and adapted to automatically load the N delivery robots with a respective freight from the freight storage and for automatically unloading a respective freight from the N delivery robots into the freight storage; and
a freight storage optimization system and with optical sensors for detecting the delivery robots present in the freight storage, the freight storage optimization system controlling a positioning of the delivery robots in the freight storage via a transmitter.

13. The mobile freight station according to claim 12, wherein the freight storage optimization system comprises an image analysis processor to determine current positioning of the delivery robots and a control unit that communicates with and controls the delivery robots in the mobile freight station via the transmitter.

14. A method for distributing, delivering, and collecting freight, the method comprising:
providing a number I of mobile freight stations, with I≥1,
automatically loading of freight into freight vehicles from a freight storage of the mobile freight station and automatic unloading of freight from the freight vehicles into the freight storage by a respective first interface in the freight station,
automatically loading and/or unloading of cargo via the first interface and automatic securement of cargo in a storage space of the freight vehicles via the first interface,
automatically securing and fixing freight in a storage space of the freight vehicles, wherein the freight vehicles comprise a security device provided in the freight storage space to secure and fix the freight present in the freight storage space;
providing delivery robots with the mobile freight stations, each with a number ni≤Ni, with i=1, . . . , I, where Ni is the maximum number of delivery robots present in the ith freight station and ni is the number of delivery robots currently present in the ith freight station; and
automatically loading of the Ni delivery robots with a respective freight from the freight storage and automatic unloading of a respective freight from the Ni delivery robots into the freight storage by a respective loading device in the I freight stations.

15. The method according to claim 14, wherein the loading device comprises a storage and retrieval machine with which freight is picked from a shelving system arranged in the freight storage for a respective delivery robot and/or freight is automatically unloaded from a delivery robot into the shelving system and/or in which the freight vehicles transport a plurality of items of freight on a freight pallet, wherein freight pallets are exchanged during loading or unloading of freight via the first interface.

16. The method according to claim 14, wherein each cargo provides a data storage storing one or more of the following information:
identifier of one of the I freight stations as target station, and/or
identification of several freight stations on the way to the destination station.

17. The method according to claim 16, wherein the data storage of each cargo also stores an address of a recipient and/or sender.

18. The method according to claim 14, wherein the I freight stations each provide a number of Ni charging interfaces for the individual automated charging of energy storage devices of the delivery robots.

19. The method according to claim 14, wherein the I freight stations each provide a first communication interface for communicating with the ni delivery robots and a second communication interface for communicating with the freight vehicles.

20. The method according to claim 14, further comprising:
   providing a freight storage optimization system and optical sensors for detecting the delivery robots present in the freight storage, and
   the freight storage optimization system controlling a positioning of the delivery robots in the freight storage via a transmitter.

21. The method according to claim 20, wherein the freight storage optimization system comprises an image analysis processor to determine current positioning of the delivery robots and a control unit that communicates with and controls the delivery robots in the mobile freight station via the transmitter.

22. The method of claim 14, further comprising the ni delivery robots autonomously transporting freight to a predetermined address in surroundings of the respective freight station i, delivering a respective freight at the predetermined address and/or receiving a freight at the predetermined address and autonomously returning directly to the freight station i.

* * * * *